US010860508B2

(12) United States Patent
Bolkhovitin et al.

(10) Patent No.: US 10,860,508 B2
(45) Date of Patent: Dec. 8, 2020

(54) OFFLOADED DISAGGREGATED STORAGE ARCHITECTURE

(71) Applicant: Western Digital Technologies, Inc., San Jose, CA (US)

(72) Inventors: Vladislav Bolkhovitin, San Jose, CA (US); Sanjay Subbarao, Irvine, CA (US); Brian W. O'Krafka, Austin, TX (US); Anand Kulkarni, San Jose, CA (US); Warren Fritz Kruger, Sunnyvale, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 81 days.

(21) Appl. No.: 15/936,319

(22) Filed: Mar. 26, 2018

(65) Prior Publication Data

US 2018/0341606 A1  Nov. 29, 2018

Related U.S. Application Data

(60) Provisional application No. 62/634,737, filed on Feb. 23, 2018, provisional application No. 62/511,326, filed on May 25, 2017.

(51) Int. Cl.
*G06F 13/28* (2006.01)
*G06F 3/06* (2006.01)
(Continued)

(52) U.S. Cl.
CPC .............. *G06F 13/28* (2013.01); *G06F 3/061* (2013.01); *G06F 3/0604* (2013.01); *G06F 3/067* (2013.01);
(Continued)

(58) Field of Classification Search
CPC ...... G06F 3/0604; G06F 3/061; G06F 3/0647; G06F 3/0656; G06F 3/067; G06F 3/0688; G06F 16/1834; H04L 67/104
(Continued)

(56) References Cited

U.S. PATENT DOCUMENTS 6,008,987 A     12/1999  Gale et al.
7,475,167 B2 *   1/2009  Wunderlich ........ H04L 67/1097
                                                     709/227
(Continued)

FOREIGN PATENT DOCUMENTS

DE     102005063281      7/2007
EP        2066158        6/2009
(Continued)

OTHER PUBLICATIONS

International Search Report and International Written Opinion of International Patent Application PCT/US2015/016656, dated May 18, 2015, 13 pages.
(Continued)

*Primary Examiner* — Reginald G Bragdon
*Assistant Examiner* — Aaron D Ho
(74) *Attorney, Agent, or Firm* — Morgan, Lewis & Bockius LLP

(57) ABSTRACT

Data management functions are offloaded from a main controller to individual storage devices in a multi-device storage environment. The main controller receives a data management request from a host system, and responds by determining one or more storage devices and one or more data management operations to be performed by the one or more storage devices. The main controller initiates performance of a data management function corresponding to the data management request, by sending one or more data management commands to the one or more storage devices,
(Continued)

and initiating one or more data transfers, such as a direct memory access operation to transfer data between a memory buffer of a storage device and a host memory buffer of the host system, and an internal data transfer between two or more of the storage devices using an internal communication fabric of the data storage subsystem.

19 Claims, 15 Drawing Sheets

(51) Int. Cl.
  *G06F 13/16* (2006.01)
  *G06F 11/10* (2006.01)
(52) U.S. Cl.
  CPC .......... *G06F 3/0647* (2013.01); *G06F 3/0656* (2013.01); *G06F 3/0688* (2013.01); *G06F 11/108* (2013.01); *G06F 13/1668* (2013.01)
(58) Field of Classification Search
  USPC ........................................................ 711/103
  See application file for complete search history.

(56) References Cited

U.S. PATENT DOCUMENTS

| | | | | |
|---|---|---|---|---|
| 8,301,832 | B1* | 10/2012 | Moore | G06F 3/061 |
| | | | | 711/103 |
| 8,731,190 | B2* | 5/2014 | Lumb | G06F 3/0608 |
| | | | | 380/37 |
| 2003/0046330 | A1* | 3/2003 | Hayes | G06F 9/5027 |
| | | | | 709/201 |
| 2008/0236791 | A1 | 10/2008 | Wayman | |
| 2010/0153975 | A1* | 6/2010 | Zwisler | G06F 3/0607 |
| | | | | 719/326 |
| 2012/0066438 | A1* | 3/2012 | Yoon | G06F 12/0246 |
| | | | | 711/103 |
| 2012/0124312 | A1 | 5/2012 | Vemuri et al. | |
| 2013/0067294 | A1* | 3/2013 | Flynn | G06F 3/0613 |
| | | | | 714/773 |
| 2013/0086336 | A1* | 4/2013 | Canepa | G06F 3/0683 |
| | | | | 711/154 |
| 2016/0110270 | A1 | 4/2016 | Iwashita | |
| 2016/0179637 | A1 | 6/2016 | Winokur | |
| 2016/0217049 | A1 | 7/2016 | Bali et al. | |
| 2017/0091022 | A1* | 3/2017 | Khan | G06F 11/108 |

FOREIGN PATENT DOCUMENTS

| | | |
|---|---|---|
| EP | 2395827 | 12/2011 |
| FR | 2560731 | 9/1985 |
| JP | H066064 | 1/1994 |
| WO | 2013142667 A1 | 9/2013 |

OTHER PUBLICATIONS

International Search Report and Written Opinion dated Nov. 22, 2017 received in International Patent Application No. PCT/US2017/050194, which corresponds to U.S. Appl. No. 15/491,915, 14 pages (Van Assche).

International Patent Application No. PCT/US2018/026450, International Search Report and the Written Opinion of the International Searching Authority, dated Jun. 25, 2018, 15 pages.

\* cited by examiner

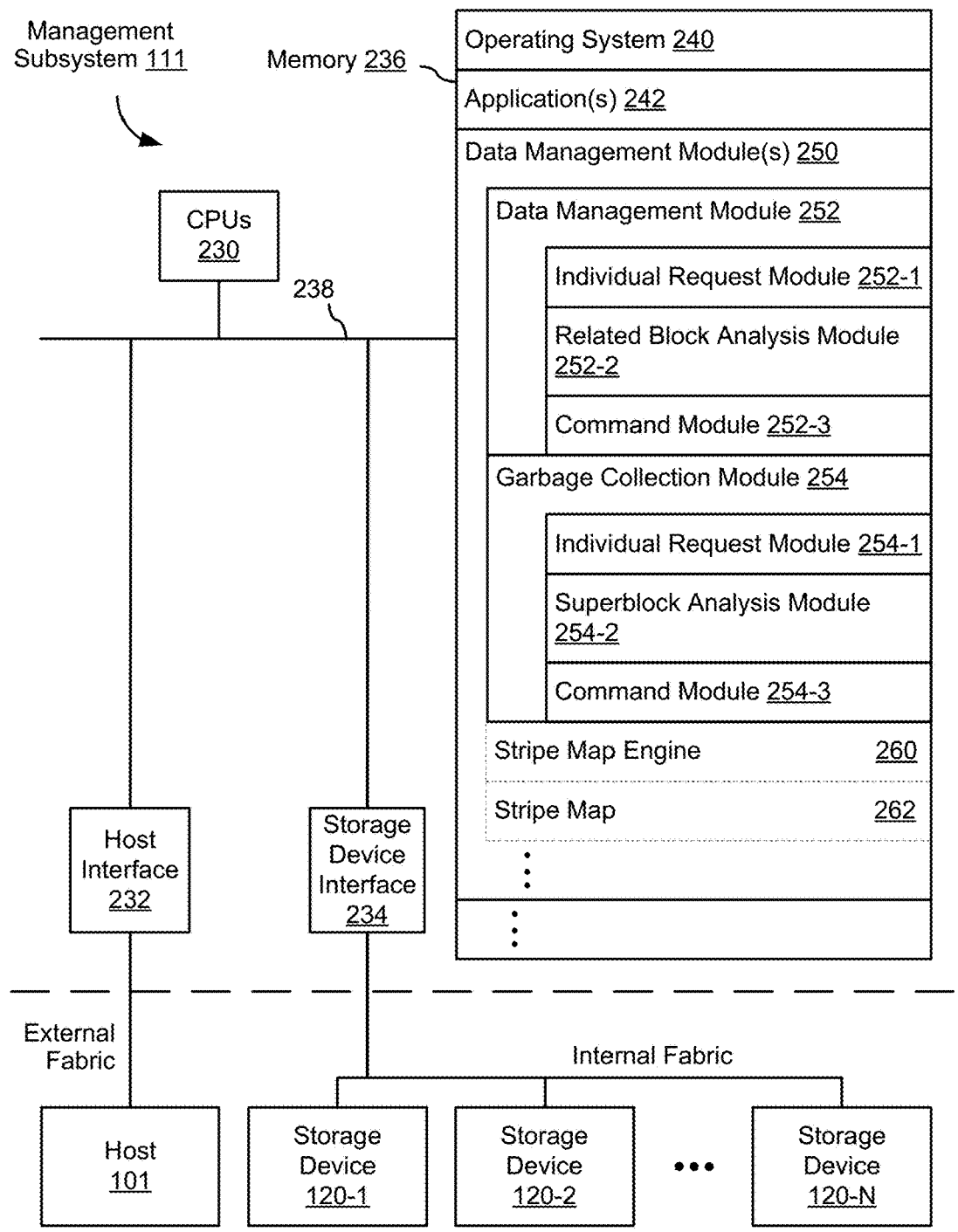
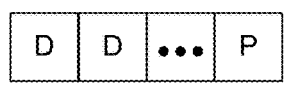
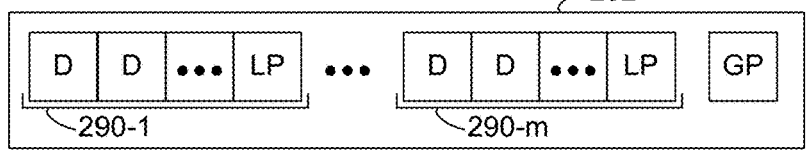

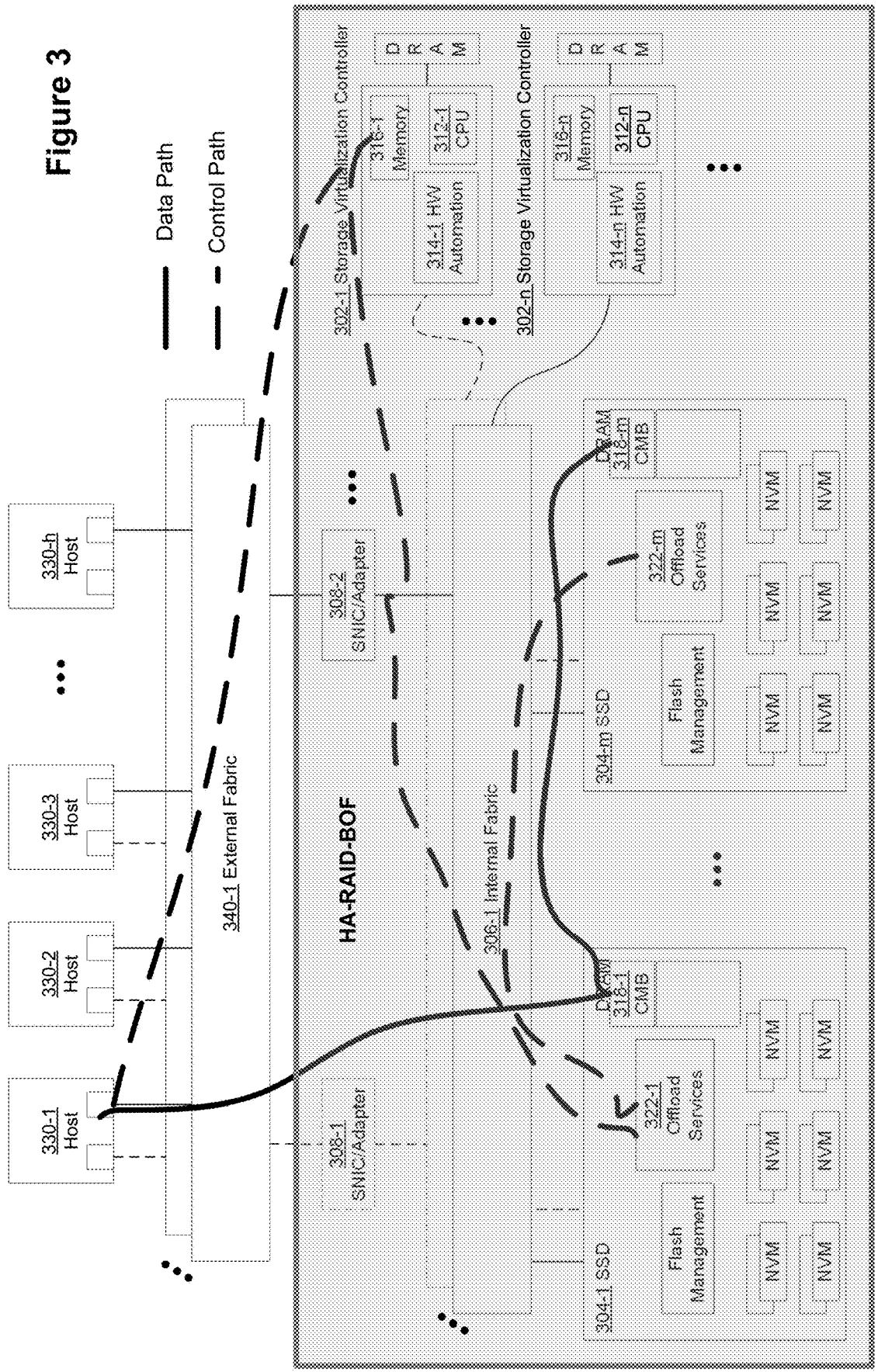

400

At a main controller subsystem connected to a plurality of storage devices in a data storage subsystem of the multi-device storage environment, receive a data management request from a host system external to the multi-device storage environment > 404 The main controller subsystem includes one or more network interface controllers > 406 The main controller subsystem includes one or more storage virtualization controllers > 408 The data management request includes request for encryption, compression, and/or redundant code computation

~402

Determine, based on the data management request, one or more storage devices of the plurality of storage devices and one or more data management operations to be performed by the one or more storage devices > 412 Receive an input logical address from the host system and indexes a Drives Virtualization Table (DVT), which maps logical addresses to storage devices, using the input logical address to identify the one or more storage devices

OFFLOADED DISAGGREGATED STORAGE ARCHITECTURE

RELATED APPLICATIONS

This application claims priority to U.S. Provisional Patent Application 62/634,737, filed on Feb. 23, 2018, and U.S. Provisional Patent Application 62/511,326, filed on May 25, 2017, "Parity Offload for Multiple Solid State Drive Devices," each of which is incorporated herein by reference in its entirety.

TECHNICAL FIELD

The disclosed embodiments relate generally to memory systems, and in particular, to disaggregated data storage systems.

BACKGROUND

Semiconductor memory devices, including flash memory, typically utilize memory cells to store data as an electrical value, such as an electrical charge or voltage. A flash memory cell, for example, includes a single transistor with a floating gate that is used to store a charge representative of a data value. Flash memory is a non-volatile data storage device that can be electrically erased and reprogrammed. More generally, non-volatile memory (e.g., flash memory, as well as other types of non-volatile memory implemented using any of a variety of technologies) retains stored information even when not powered, as opposed to volatile memory, which requires power to maintain the stored information. Non-volatile memory systems can be implemented in storage networks. There is an emerging trend in the storage industry to deploy disaggregated storage, e.g. top of rack storage. Disaggregated storage brings significant cost savings via decoupling compute and storage node life cycles and allowing different nodes or subsystems to have different compute to storage ratios. In addition, disaggregated storage allows significant flexibility in migrating compute jobs from one physical server to another, for availability and load balancing purposes.

Disaggregated storage has been implemented using a number of system architectures, including the passive Just-a-Bunch-of-Disks (JBOD) architecture, the traditional All-Flash Architecture (AFA), and Ethernet Attached Bunch of Flash (EBOF) disaggregated storage, which typically uses specialized chips from Mellanox or Kazan to translate commands from external NVMe-OF™ (NVM Express™ over Fabrics) protocol to internal NVMe (NVM Express™) protocol. None of these architectures makes good use of the I/O bandwidth of the individual storage devices (e.g., solid-state drives (SSD's)) in such systems. Accordingly, there exists a need to overcome the deficiencies and limitations of such disaggregated storage systems.

SUMMARY

Various embodiments of systems, methods and devices within the scope of the appended claims each have several aspects, no single one of which is solely responsible for the attributes described herein. Without limiting the scope of the appended claims, after considering this disclosure, and particularly after considering the section entitled "Detailed Description," one will understand how the aspects of various embodiments are used to enable higher throughput in storage to memory devices.

The disclosed system and method improve the performance of non-volatile memory storage by offloading data management functions in a multi-device storage environment. At a main controller subsystem, connected to a plurality of storage devices in a data storage subsystem of the multi-device storage environment, the main controller subsystem receives a data management request from a host system external to the multi-device storage environment. The main controller subsystem responds by determining, based on the data management request, one or more storage devices of the plurality of storage devices and one or more data management operations to be performed by the one or more storage devices. Then the main controller subsystem initiates performance of a data management function corresponding to the data management request, by sending one or more data management operations to the one or more storage devices, and initiating one or more data transfers. The one or more data transfers includes one or more operations selected from the set consisting of a direct memory access operation to transfer data between a memory buffer of a respective storage device of the data storage subsystem and a host memory buffer of the host system, and an internal data transfer between two or more of the storage devices using an internal communication fabric of the data storage subsystem that interconnects the plurality of storage devices. Upon completion of the data management function, the main controller subsystem sends a completion notification to the host system, the completion notification indicating the data management function has completed.

In another aspect, some embodiments provide a system to perform any of the methods described herein.

In yet another aspect, some embodiments include a non-transitory computer-readable storage medium storing one or more programs for execution by one or more processors of a computing system, the one or more programs including instructions for performing any of the methods described herein.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

FIGS. 2A-2B are block diagrams illustrating implementations of management modules, in accordance with some embodiments.

FIG. 2C shows an example of a Redundancy Coding stripe having one or more parity data storage devices (e.g., SSDs), while FIG. 2D shows an example of a Redundancy Coding stripe having two or more mini-stripes, each mini-stripe having multiple data storage devices and one or more local parity data storage devices, and a global parity data storage device.

FIG. 3 illustrates an example implementation of an offloaded disaggregated storage architecture, in accordance with some embodiments.

FIGS. 4A-4J illustrate a flowchart diagram of a method of offloading data management requests in a disaggregated storage system, in accordance with some embodiments.

Figure 1A:
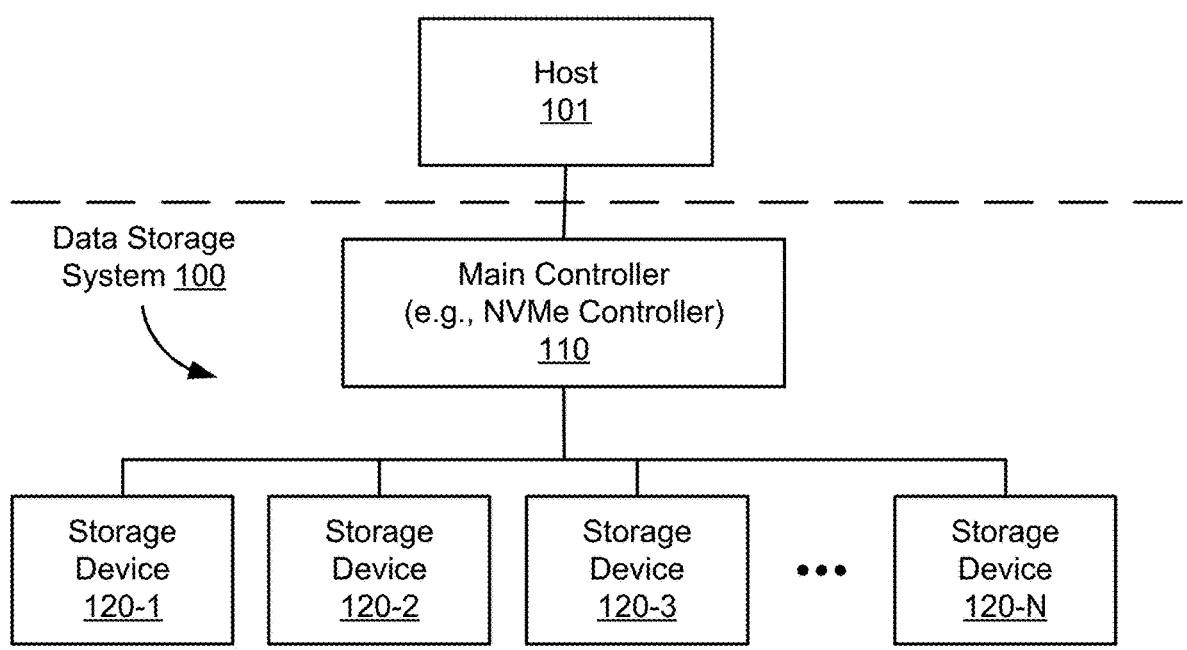
FIGS. 1A-1B are block diagrams illustrating an implementation of a data storage system, in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Figure 1B:
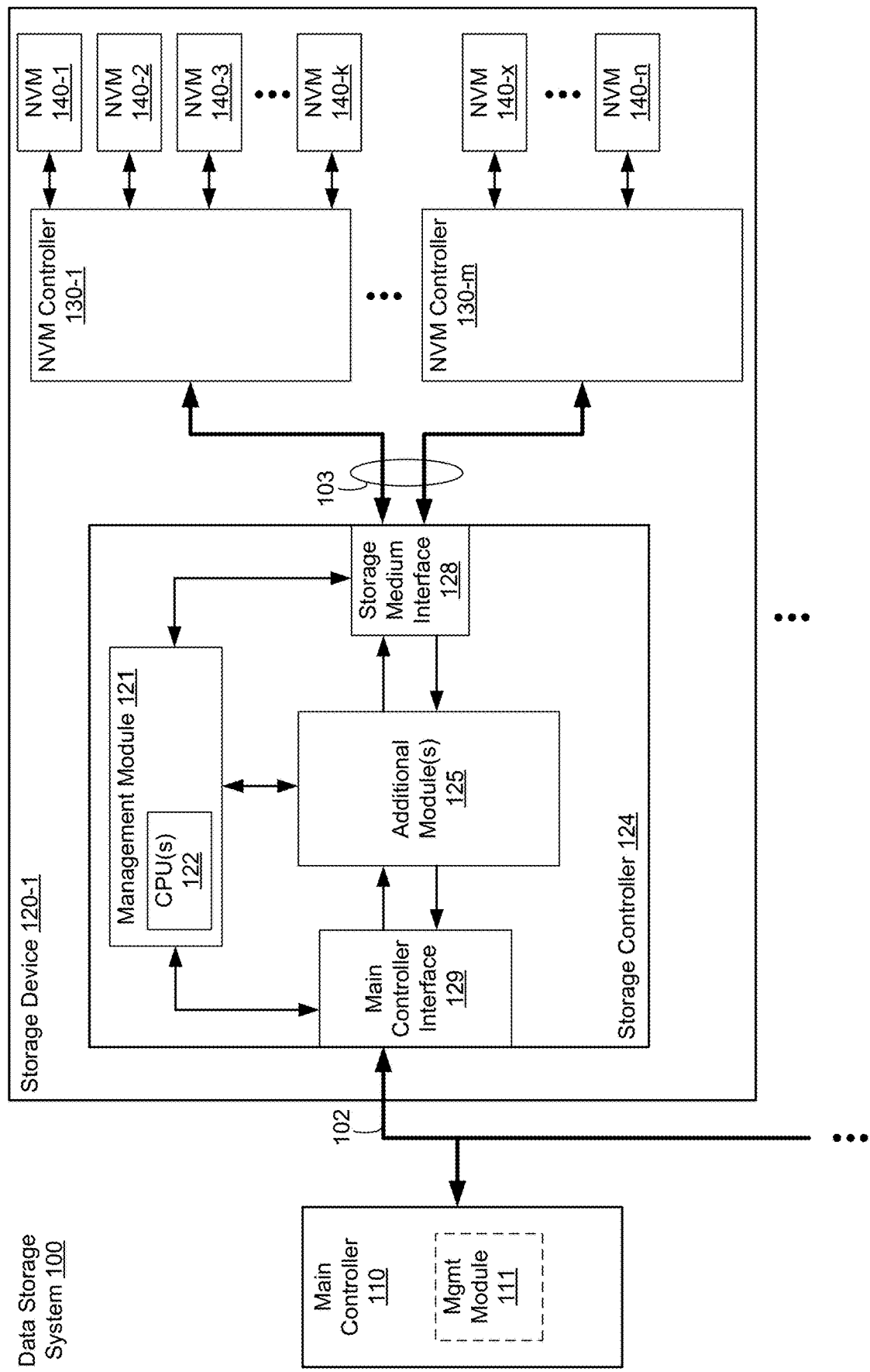

The various implementations described herein include systems, methods and/or devices that improve the performance of non-volatile memory storage by offloading data management functions to one or more storage devices in a multi-device disaggregated storage environment (e.g., storage devices 120 with non-volatile memory (NVM) devices 140 in storage environment 100, FIGS. 1A-1B).

(A1) At a main controller subsystem, connected to a plurality of storage devices in a data storage subsystem of a multi-device storage environment, a data management function offloading method is performed, beginning with the main controller subsystem receiving a data management request from a host system external to the multi-device storage environment. The main controller subsystem responds by determining, based on the data management request, one or more storage devices of the plurality of storage devices and one or more data management operations to be performed by the one or more storage devices. Then the main controller subsystem initiates performance of a data management function corresponding to the data management request, by sending one or more data management operations to the one or more storage devices, and initiating one or more data transfers. The one or more data transfers includes one or more operations selected from the set consisting of a direct memory access operation to transfer data between a memory buffer of a respective storage device of the data storage subsystem and a host memory buffer of the host system, and an internal data transfer between two or more of the storage devices using an internal communication fabric of the data storage subsystem that interconnects the plurality of storage devices. Upon completion of the data management function, the main controller subsystem sends a completion notification to the host system, the completion notification indicating the data management function has completed.

(A2) In some embodiments of the method of A1, the data management request is a data read request, and the data management function is a data read function. In some embodiments, initiating performance of the data management function includes determining, based on one or more mapping tables, a set of memory blocks located in a respective storage device of the one or more storage devices. The method further includes determining (e.g., selecting) a controller memory buffer from one or more controller memory buffers, the controller memory buffer corresponding to (e.g., dynamically allocated to or assigned to) the respective storage device in the one or more storage devices. The method further includes sending one or more data read commands to the respective storage device to perform the data read function on the set of memory blocks by using the one or more controller memory buffers, receiving a finish notification from the respective storage device, and upon receiving the finish notification, initiating a data transfer using the direct memory access operation.

(A3) In some embodiments of the method of A2, initiating the data transfer using the direct memory access operation includes sending a data transfer command to a respective network interface controller in one or more network interface controllers in the data storage subsystem to transfer data from the controller memory buffer to a host memory buffer accessible to the host system.

(A4) In some embodiments of the method of A2, computation of the one or more mapping tables is initiated by the main controller subsystem.

(A5) In some embodiments of the method of A2, the one or more mapping tables are previously computed (e.g., prior to the main controller subsystem receiving the data management request) by the main controller subsystem (or by another system and provided to the main controller subsystem prior to the main controller subsystem receiving the data management request).

(A6) In some embodiments of the method of A1, the data management request is a data write request, and the data management function is a data write function. In some such embodiments, initiating performance of the data management functions includes determining a data stripe including a set of memory blocks, each memory block in the set of memory blocks located in a respective storage device of the one or more storage devices. In some such embodiments, initiating performance of the data management functions further includes, for each set of write data in one or more sets of write data specified by the data write request, performing a set of operations. The set of operations includes determining (e.g., selecting) a first controller memory buffer from one or more controller memory buffers, the first controller memory buffer corresponding to (e.g., dynamically allocated to or assigned to) a first storage device of the one or more storage devices where parity data for the data stripe is to be stored. The set of operations further includes determining a second controller memory buffer from the one or more controller memory buffers, the second controller memory buffer corresponding to a second storage device of the one or more storage devices where the set of write data is to be stored. In some such embodiments, the set of operations further includes initiating two data transfers using the direct memory access operation to send the write data specified by the data write request to the first controller memory buffer and the second controller memory buffer, receiving one or more data transfer completion notifications corresponding to the two data transfers, and upon receiving the one or more data transfer completion notifications, (i) sending a data write command to the second storage device to write the set of write data from the second controller memory buffer to non-volatile memory in the second storage device, and (ii) sending a parity computation command to the first storage device to perform a parity computation on the set of write data in the first controller memory buffer.

(A7) In some embodiments of the method of A6, initiating the two data transfers using the direct memory access operation comprises sending a first data transfer command to a respective network interface controller, of one or more network interface controllers in the data storage subsystem, to transfer data from a first host memory buffer to the first controller memory buffer. In such embodiments, initiating the two data transfers using the direct memory access operation further includes sending a second data transfer command to a respective network interface controller (e.g., which may or may not be the same one used for the first data transfer) in the one or more network interface controllers in the data storage subsystem to transfer data from a second host memory buffer to the second controller memory buffer, where the first host memory buffer and the second memory buffer are accessible to the host system.

(A8) In some embodiments of the method of A6 or A7, the method further includes closing the data stripe, including writing parity data computed by the first storage device to non-volatile memory in the first storage device.

(A9) In some embodiments of the method of any of A6-A8, the method further includes updating one or more mapping tables in accordance with the storage devices to which the one or more sets of write data were written.

(A10) In some embodiments of the method of A9, updating of the one or more mapping tables is initiated by the main controller subsystem.

(A11) In some embodiments of the method of A9, the one or more mapping tables are computed by the main controller subsystem.

(A12) In some embodiments of the method of A1, the data management request is a data write request, the data management function is a data write function, and initiating performance of the data management functions comprises a first set of operations. In some such embodiments, the first set of operations includes determining a data stripe including a set of memory blocks, each memory block in the set of memory blocks located in a respective storage device of the one or more storage devices (e.g., each memory block in the data stripe is typically located in a distinct SSD). In such embodiments, the first set of operations further includes, for each set of write data in one or more sets of write data specified by the data write request, performing a second set of operations. The second set of operations includes determining (e.g., selecting) a first controller memory buffer from one or more controller memory buffers, the first controller memory buffer corresponding to (e.g., allocated to) a first storage device of the one or more storage devices where parity data for the data stripe is to be stored. Optionally, the one or more controller memory buffers were previously (e.g., prior to the main controller subsystem receiving the data write request) allocated by the main controller subsystem. The second set of operations further includes determining a second controller memory buffer from the one or more controller memory buffers, the second controller memory buffer corresponding to a second storage device of the one or more storage devices where the set of write data is to be stored, initiating a data transfer using the direct memory access operation to send the write data specified by the data write request to the second controller memory buffer, and receiving a data transfer completion notification corresponding to the data transfer. The second set of operations further includes upon receiving the data transfer completion notification, (i) sending a data write command to the second storage device to write the set of write data from the second controller memory buffer to non-volatile memory in the second storage device, and (ii) sending one or more subsequent commands to the first storage device and/or the second storage device to perform a peer-to-peer transfer of the write data from the second controller memory buffer to the first controller memory buffer and to perform a parity computation at the first storage device on the set of write data in the first controller memory buffer.

(A13) In some embodiments of the method of A1, the data management request is a data compaction request, the data management function is a data compaction function, and initiating performance of the data management functions comprises: identifying a set of memory blocks to compact; for each respective memory block in the identified set of memory blocks: determining a first storage device where the data for the respective memory block is located and a second storage device where parity data for the respective memory block is located; sending to the first storage device a block compaction request and to the second storage device a parity rebuild command to rebuild parity; and receiving one or more finish notifications from the first storage device and the second storage device.

(A14) In some embodiments of the method of A13, identifying the set of memory blocks to compact includes: receiving from the one or more storage devices information identifying a first set of candidate memory blocks to compact; and determining, from the first set of candidate memory blocks, a second set of memory blocks to compact, the second set of memory blocks comprising a subset of the identified set of memory blocks.

(A15) In some embodiments of the method of A13, the method further includes transferring compacted data, generated in response to one or more of the block compaction requests, from the first storage device to the second storage device using the internal communication fabric of the data storage subsystem that interconnects the plurality of storage devices.

(A16) In some embodiments of any of the methods of A2-A5, determining the one or more storage devices of the plurality of storage devices includes receiving an input logical address from the host system and indexing a Drives Virtualization Table (DVT), which maps logical addresses to storage devices, using the input logical address to identify the one or more storage devices.

(A17) In some embodiments of any of the methods of A6-A12, the one or more mapping tables includes a Virtual Erase Block Address (VEBA) table previously computed by the main controller subsystem, and updating the one or more mapping table includes updating a Drives Virtualization Table (DVT) that maps logical addresses to storage devices.

(A18) In some embodiments of any of the methods of A1, A2, A4-A6, and A8-A17, the main controller subsystem includes one or more network interface controllers.

(A19) In some embodiments of any of the methods of A1-18, the main controller subsystem includes one or more storage virtualization controllers.

(A20) In some embodiments of any of the methods of A1-A19, the data management function includes encryption, compression, and/or redundant code computation.

(A21) In another aspect, a main controller subsystem is configured to perform the method of any of A1 to A20.

(A22) In yet another aspect, a non-transitory computer readable storage medium stores a set of instructions, that when executed by one or more processors of a main controller subsystem, cause the main controller subsystem to perform the method of any of A1 to A20.

FIGS. 1A-1B are block diagrams illustrating data storage system 100, in accordance with some embodiments. While some example features are illustrated, various other features have not been illustrated for the sake of brevity and so as not to obscure pertinent aspects of the example embodiments disclosed herein. To that end, as a non-limiting example, data storage system 100 includes one or more data storage devices 120 (also sometimes called information storage devices, storage devices, or memory devices). In some embodiments, the data storage devices 120 are, or include, solid-state drives (SSD's). Each data storage device 120 includes a storage controller 124 and non-volatile memory (e.g., one or more NVM device(s) 140, such as one or more flash memory devices), which are used in conjunction with main controller 110, one example of which is an NVMe controller. In some embodiments, a respective data storage device 120 of the one or more data storage devices includes one or more non-volatile memory (NVM) controllers 130 such as flash controllers or channel controllers (e.g., for storage devices having NVM devices in multiple memory channels), while in other embodiments the NVM devices are controlled by storage controller 124 without intervening NVM controllers 130.

In some embodiments, a respective data storage device 120 includes a single NVM device 140 while in other embodiments the respective data storage device 120 includes a plurality of NVM devices 140. In some embodiments, NVM devices 140 include NAND-type flash memory or NOR-type flash memory. In some embodiments, data storage device 120 includes one or more hard disk drives (HDDs). In some embodiments, a respective NVM device 140 of the one or more NVM devices 140 includes a flash memory device, which in turn includes one or more flash memory die, one or more flash memory packages, one or more flash memory channels or the like. However, in some embodiments, one or more of the NVM devices 140 have other types of non-volatile data storage media (e.g., PCRAM, ReRAM, STT-RAM, MRAM, etc.). Further, in some embodiments, NVM controllers 130, if included in a respective data storage device 120, are solid-state drive (SSD) controllers.

Main controller 110 is coupled to storage controller 124 through data connections 102. However, in some embodiments, main controller 110 includes storage controller 124, or a portion of storage controller 124, as a component and/or a subsystem. For example, in some embodiments, some or all of the functionality of storage controller 124 is implemented by software executed on main controller 110. Main controller 110 is sometimes called a controller system, a main controller system, a non-volatile memory express (NVMe) controller, garbage collection (GC) leader, or storage virtualization controller. In some embodiments, a storage controller 124 or NVM controller 130 associated with a particular storage device (e.g., 120-1) acts as a main controller 110 for other storage devices (e.g., 120-2, 120-3, and 120-N) in data storage system 100. In some embodiments, main controller 110 is a component and/or subsystem of host 101 (described below).

In some embodiments, host 101 is coupled to data storage system 100 through host interface 232 (FIG. 2B). In some embodiments, multiple hosts 101 (only one of which is shown in FIG. 1A) are coupled to data storage system 100 through host interface 232, which may be a storage network interface or other interface capable of supporting communications with multiple hosts 101.

Host 101, or a respective host in a system having multiple hosts, may be any suitable computer device, such as a computer, a laptop computer, a tablet device, a netbook, an internet kiosk, a personal digital assistant, a mobile phone, a smart phone, a gaming device, a computer server, or any other computing device. Host 101 is sometimes called a host system, client, or client system. In some embodiments, host 101 is a server system, such as a server system in a data center. In some embodiments, the one or more hosts 101 are one or more host devices distinct from the main controller 110 and distinct from the plurality of storage devices 120; but in some other embodiments, the one or more hosts 101 include one of the storage devices 120 that has been configured to perform data processing operations and to send data storage commands to access data stored in the one or more storage devices 120. In some other embodiments, the one or more hosts 101 are configured to store and access data in the plurality of storage devices 120.

In some embodiments, main controller 110 includes one or more processors, one or more types of memory, a display and/or other user interface components such as a keyboard, a touch screen display, a mouse, a track-pad, a digital camera, and/or any number of supplemental devices to add functionality. In some embodiments, main controller 110 does not have a display and other user interface components.

The one or more NVM controllers 130, if included in a respective storage device 120, are coupled with storage controller 124 through connections 103. Connections 103 are sometimes called data connections, but typically convey commands in addition to data, and optionally convey metadata, error correction information and/or other information in addition to data values to be stored in NVM devices 140 and data values read from NVM devices 140. In some embodiments, however, storage controller 124, the one or more NVM controllers 130, and NVM devices 140 are included in the same device (i.e., an integrated device) as components thereof. Furthermore, in some embodiments, one or more of the storage devices 120 (e.g., including storage controller 124, the one or more NVM controllers 130, and NVM devices 140) are embedded in a host device (e.g., main controller 110 or host 101), such as a mobile device, tablet, other computer or computer controlled device, and the methods described herein are performed, at least in part, by the embedded storage controller. In some embodiments, storage controller 124 is configured to control, and is directly coupled to, one or more NVM devices 140, rendering one or more (or all) of the NVM controllers 130 optional or unnecessary.

In some embodiments, a storage device 120 includes NVM devices 140 such as flash memory devices (e.g., NVM devices 140-$l$ through 140-$k$, and NVM devices 140-$x$ through 140-$n$) and optionally includes NVM controllers 130 (e.g., NVM controllers 130-1 through 130-$m$). Viewed another way, in some embodiments, a storage device 120 includes m memory channels, each of which has an NVM controller 130 and a set of NVM devices 140 coupled to the NVM controller 130, where m is an integer greater than one. However, in some embodiments, two or more memory channels share an NVM controller 130. In either example, each memory channel has its own distinct set of NVM devices 140. In a non-limiting example, the number of memory channels in a typical storage device is 8, 16, or 32. In another non-limiting example, the number of NVM devices 140 per memory channel is typically 8, 16, 32, or 64. Furthermore, in some embodiments, the number of NVM devices 140 in one memory channel is different from the number of NVM devices in another one of the memory channels.

In some embodiments, each NVM controller of NVM controllers 130 includes one or more processing units (also sometimes called CPUs or processors or microprocessors or microcontrollers) configured to execute instructions in one or more programs (e.g., in NVM controllers 130). In some embodiments, the one or more processors are shared by one or more components within, and in some cases, beyond the function of NVM controllers 130. As noted above, NVM devices 140 are coupled to NVM controllers 130 through connections that typically convey commands in addition to data, and optionally convey metadata, error correction information and/or other information in addition to data values to be stored in NVM devices 140 and data values read from NVM devices 140. NVM devices 140 may include any number (i.e., one or more) of memory devices including, without limitation, non-volatile semiconductor memory devices, such as flash memory device(s).

Flash memory device(s) (e.g., NVM devices 140) can be configured for enterprise storage suitable for applications such as cloud computing, for database applications, primary and/or secondary storage, or for caching data stored (or to be stored) in secondary storage, such as hard disk drives. Additionally, and/or alternatively, flash memory device(s) (e.g., NVM devices 140) can also be configured for relatively smaller-scale applications such as personal flash drives or hard-disk replacements for personal, laptop, and tablet computers. Although flash memory devices and flash controllers are used as an example here, in some embodiments storage device(s) 120 include other non-volatile memory device(s) and corresponding non-volatile storage controller(s).

In some embodiments, NVM devices 140 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

In some embodiments, as shown in FIG. 1B, storage controller 124 includes a management module 121, a main controller interface 129, a storage medium (I/O) interface 128, and additional module(s) 125. Storage controller 124 may include various additional features that have not been illustrated for the sake of brevity and so as not to obscure pertinent features of the example embodiments disclosed herein, and a different arrangement of features may be possible.

Main controller interface 129 provides an interface to main controller 110 through data connections 102. Similarly, storage medium interface 128 provides an interface to non-volatile memory (via NVM controllers 130, if included in storage device 120) though connections 103. In some embodiments, storage medium interface 128 includes read and write circuitry, including circuitry capable of providing reading signals to NVM controllers 130 (e.g., reading threshold voltages for NAND-type flash memory) or to NVM devices 140 if storage device 120 does not include NVM controllers 130. In some embodiments, connections 102 and connections 103 are implemented as communication media over which commands and data are communicated, using a protocol such as NVMe, DDR3, SCSI, SATA, SAS, or the like.

Figure 2A:
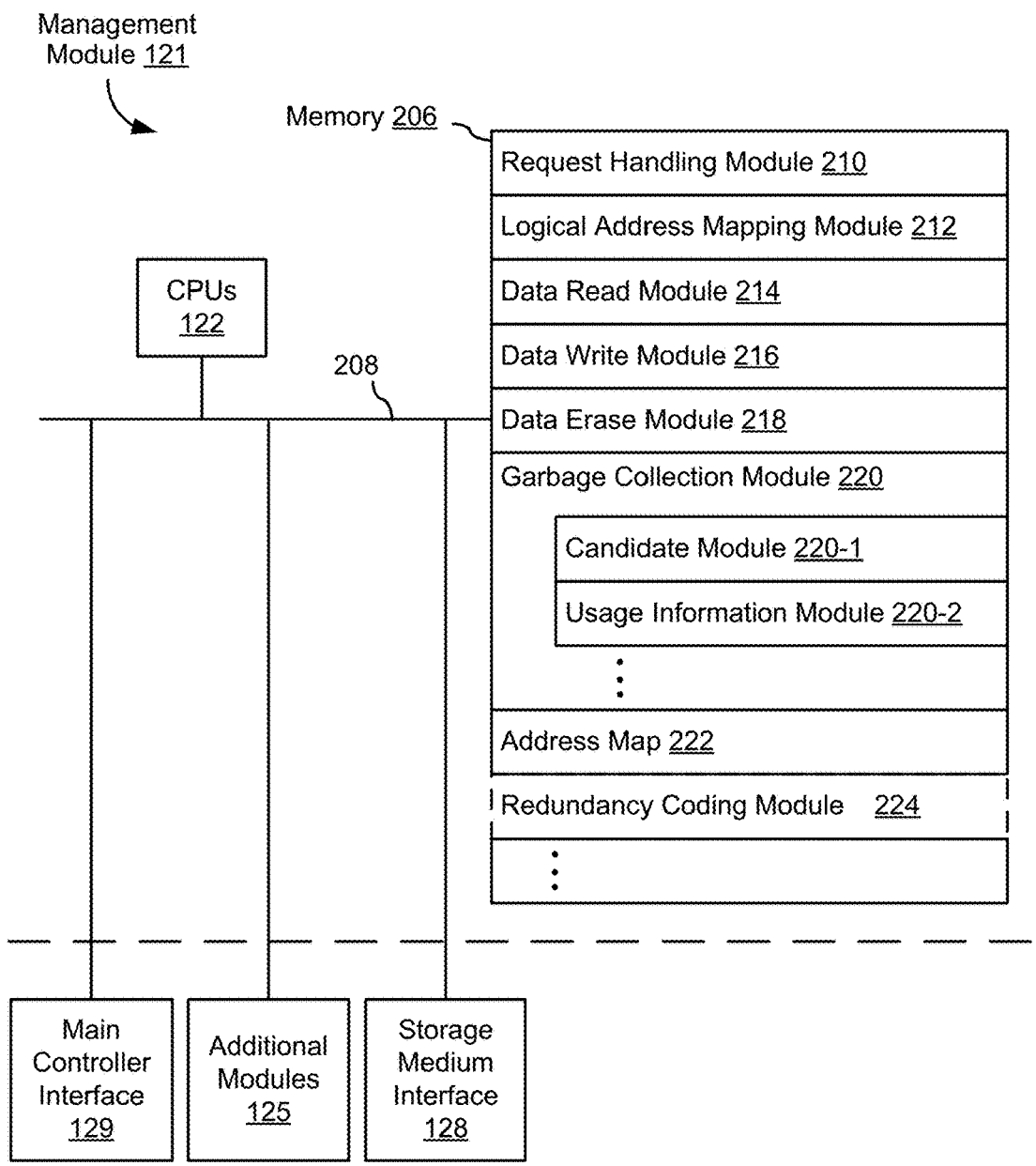

In some embodiments, as shown in FIG. 2A, management module 121 includes one or more processing units 122 (sometimes herein called CPUs, processors, or hardware processors, and sometimes implemented using microprocessors, microcontrollers, or the like) configured to execute instructions in one or more programs (e.g., in management module 121). In some embodiments, the one or more CPUs 122 are shared by one or more components within, and in some cases, beyond the function of storage controller 124. Management module 121 is coupled to main controller interface 129, additional module(s) 125 and storage medium interface 128 in order to coordinate the operation of these components. In some embodiments, one or more modules or functions of management module 121 are implemented in management module 111 of main controller 110. In some embodiments, one or more processors of main controller 110 (not shown) are configured to execute instructions in one or more programs (e.g., in management module 111). In some embodiments, management module 111 is coupled to storage device(s) 120 in order to manage the operation of storage device(s) 120.

Additional module(s) 125 are coupled to storage medium interface 128, main controller interface 129, and management module 121. As an example, additional module(s) 125 may include an error control module to limit the number of uncorrectable errors inadvertently introduced into data during writes to memory and/or reads from memory. In some embodiments, additional module(s) 125 are executed in software by the one or more CPUs 122 of management module 121; in other embodiments, additional module(s) 125 are implemented in whole or in part using special purpose circuitry (e.g., to perform encoding and decoding functions). In some embodiments, additional module(s) 125 are implemented in whole or in part by software executed on main controller 110.

In some embodiments, an error control module, included in additional module(s) 125, includes an encoder and a decoder. In some embodiments, the encoder encodes data by applying an error control code (ECC), sometimes called an error-correcting code, to produce a codeword, which is subsequently stored in NVM devices 140. When encoded data (e.g., one or more codewords) is read from NVM devices 140, the decoder applies a decoding process to the encoded data to recover the data, and to correct errors in the recovered data within the error correcting capability of the error control code. Those skilled in the art will appreciate that various error control codes have different error detection and correction capacities, and that particular codes are selected for various applications for reasons beyond the scope of this disclosure. As such, an exhaustive review of the various types of error control codes is not provided herein. Moreover, those skilled in the art will appreciate that each type or family of error control codes may have encoding and decoding algorithms that are particular to the type or family of error control codes. On the other hand, some algorithms may be utilized at least to some extent in the decoding of a number of different types or families of error control codes. As such, for the sake of brevity, an exhaustive description of the various types of encoding and decoding algorithms generally available and known to those skilled in the art is not provided herein.

In some embodiments, during a write operation initiated by a host 101, main controller 110 receives a host write command (e.g., in a set of one or more host write commands) via host interface 232 (FIG. 2B), translates that host write command into a write command, sometimes called a translated command or translated write command, suitable for execution by a data storage device 120, and sends the translated command to one or more data storage devices corresponding to one more addresses specified by the host write command. Main controller 110 also receives, via host interface 232, data to be stored in the one or more data storage devices corresponding to the one more addresses specified by the host write command. A respective data storage device receives the data to be stored in its NVM device 140, or a portion of the data to be stored, from main controller 110 via the main controller's storage device interface 234 (FIG. 2B) and the data storage device's main controller interface 129 (FIG. 2A). The data received by main controller interface 129 is made available to an encoder (e.g., in additional module(s) 125), which encodes the data to produce one or more codewords. The one or more codewords are made available to storage medium interface 128, which transfers the one or more codewords to NVM devices 140 (e.g., through NVM controllers 130) in a manner dependent on the type of storage medium being utilized.

In some embodiments, a read operation is initiated when a host 101 sends a host read command (e.g., in a set of one or more host read commands), to main controller 110, which translates the received host read command into a read command (e.g., into a lower level data storage device command, sometimes herein called a translated command or translated read command, suitable for execution by a data storage device 120) and sends the translated read command to the storage controller 124 of a respective data storage device 120 (FIG. 1B), requesting data from that data storage device's storage medium (e.g., one or more NVM devices 140). Storage controller 124 sends one or more read access commands to NVM devices 140, via storage medium interface 128 (e.g., through NVM controllers 130), in accordance with memory locations (addresses) specified by the host read command. Storage medium interface 128 provides the raw read data (e.g., comprising one or more codewords) to decoder 327. The read access commands correspond to the received read command, but the read command is converted by storage controller 124 into read access commands, for example so as to be directed to one or more specific NVM device 140.

In response to the one or more read access commands sent to the NVM devices 140, storage medium interface 128 receives raw read data (e.g., comprising one or more codewords) from one or more NVM devices and provides the raw read data to a decoder (e.g., in additional module(s) 125). If the decoding is successful, the decoded data is provided to main controller interface 129, where the decoded data is made available to main controller 110. In some embodiments, if the decoding is not successful, storage controller 124 may resort to a number of remedial actions or provide an indication of an irresolvable error condition.

As explained above, a storage medium (e.g., NVM devices 140) is divided into a number of addressable and individually selectable blocks and each block is optionally (but typically) further divided into a plurality of pages and/or word lines and/or sectors. While erasure of data from a storage medium is performed on a block basis, in many embodiments, reading and programming of the storage medium is performed on a smaller subunit of a block (e.g., on a page basis, word line basis, or sector basis). In some embodiments, the smaller subunit of a block consists of multiple memory cells (e.g., single-level cells or multi-level cells). In some embodiments, programming is performed on an entire page. In some embodiments, a multi-level cell (MLC) NAND flash typically has four possible states per cell, yielding two bits of information per cell. Further, in some embodiments, a MLC NAND has two page types: (1) a lower page (sometimes called the fast page), and (2) an upper page (sometimes called the slow page). In some embodiments, a triple-level cell (TLC) NAND flash has eight possible states per cell, yielding three bits of information per cell. Although the description herein uses TLC, MLC, and SLC as examples, those skilled in the art will appreciate that the embodiments described herein may be extended to memory cells that have more than eight possible states per cell, yielding more than three bits of information per cell. In some embodiments, the encoding format of the storage media (i.e., TLC, MLC, or SLC and/or a chosen data redundancy mechanism or ECC code) is a choice made when data is actually written to the storage media.

As an example, if data is written to a storage medium in pages, but the storage medium is erased in blocks, pages in the storage medium may contain invalid (e.g., stale) data, but those pages cannot be overwritten until the whole block containing those pages is erased. In order to write to the pages with invalid data, the pages (if any) with valid data in that block are read and re-written to a new block and the old block is erased (or put on a queue for erasing). This process is called garbage collection. After garbage collection, the new block contains the pages with valid data and may have free pages that are available for new data to be written, and the old block can be erased so as to be available for new data to be written. Since flash memory can only be programmed and erased a limited number of times, the efficiency of the algorithm used to pick the next block(s) to re-write and erase has a significant impact on the lifetime and reliability of flash-based storage systems.

Write amplification is a phenomenon where the actual amount of physical data written to a storage medium (e.g., NVM devices 140 in storage device 120) is a multiple of the logical amount of data written by a host (e.g., host 101, or main controller 110, sometimes called a host) to the storage medium. As discussed above, when a block of storage medium must be erased before it can be re-written, the garbage collection process to perform these operations results in re-writing data one or more times. This multiplying effect increases the number of writes required over the life of a storage medium, which shortens the time it can reliably operate.

One of the goals of any flash memory based data storage system architecture is to reduce write amplification as much as possible so that available endurance is used to meet storage medium reliability and performance specifications. Higher system endurance also results in lower cost as the storage system may need less over-provisioning. By reducing write amplification, the endurance of the storage medium is increased and the overall cost of the storage system is decreased. Generally, garbage collection is performed on erase blocks with the fewest number of valid pages for best performance and best write amplification.

Flash memory devices utilize memory cells to store data as electrical values, such as electrical charges or voltages. Each flash memory cell typically includes a single transistor with a floating gate that is used to store a charge, which modifies the threshold voltage of the transistor (i.e., the voltage needed to turn the transistor on). The magnitude of the charge, and the corresponding threshold voltage the charge creates, is used to represent one or more data values. In some embodiments, during a read operation, a reading threshold voltage is applied to the control gate of the transistor and the resulting sensed current or voltage is mapped to a data value.

The terms "cell voltage" and "memory cell voltage," in the context of flash memory cells, means the threshold voltage of the memory cell, which is the minimum voltage that needs to be applied to the gate of the memory cell's transistor in order for the transistor to conduct current. Similarly, reading threshold voltages (sometimes also called reading signals and reading voltages) applied to a set of flash memory cells (e.g., the flash memory cells in a selected page) are gate voltages applied to the gates of the flash memory cells to determine whether the memory cells conduct current at that gate voltage. In some embodiments, when a flash memory cell's transistor conducts current at a given reading threshold voltage, indicating that the cell voltage is less than the reading threshold voltage, the raw data value for that read operation is a "1" and otherwise the raw data value is a "0."

FIG. 2A is a block diagram illustrating a management module 121, in accordance with some embodiments, as shown in FIG. 1B. Management module 121 typically includes one or more processing units 122 (sometimes herein called CPUs, processors, or hardware processors, and sometimes implemented using microprocessors, microcontrollers, or the like) for executing modules, programs, and/or instructions stored in memory 206 and thereby performing processing operations, memory 206 (sometimes called controller memory), and one or more communication buses 208 for interconnecting these components. The one or more communication buses 208 optionally include circuitry (sometimes called a chipset) that interconnects and controls communications between system components. Management module 121 is coupled to main controller interface 129, additional module(s) 125, and storage medium interface 128 by the one or more communication buses 208. Memory 206 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. Memory 206 optionally includes one or more storage devices remotely located from CPU(s) 122. Memory 206, or alternatively the non-volatile memory device(s) within memory 206, comprises a non-transitory computer readable storage medium. In some embodiments, memory 206, or the non-transitory computer readable storage medium of memory 206 stores the following programs, modules, and data structures, or a subset or superset thereof:

- request handling module 210 for receiving input/output (I/O) requests from a host or main controller (e.g., write requests and/or read requests, sometimes called write command and read commands, or host write commands and host read commands);
- logical address mapping module 212, used in some embodiments to translate addresses or name spaces in received host commands into data storage device identifiers and/or data storage device addresses, as further described below;
- data read module 214 data for reading data, or causing data to be read, from storage device 120 (e.g., NVM devices 140);
- data write module 216 for writing data, or causing data to be written, to storage device 120 (e.g., NVM devices 140);
- data erase module 218 for erasing data, or causing data to be erased, from storage device 120 (e.g., NVM devices 140);
- garbage collection module 220 for performing a garbage collection process on one or more memory portions (i.e., blocks) of storage device 120 (e.g., NVM devices 140);
  - candidate module 220-1 for identifying memory devices (e.g., NVM devices 140) or specific blocks of memory as candidates for management operations (e.g., garbage collection);
  - usage information module 220-2 for collecting usage information of memory devices (e.g., NVM devices 140); and
- address map 222 storing an address map (used, for example, by logical address mapping module 212), which maps logical addresses recognized by the host (e.g., main controller 110 and/or host 101, FIGS. 1A-1B) to data storage device identifiers and/or data storage device addresses of storage device 120 (e.g., NVM devices 140).

Each of the above identified elements may be stored in one or more of the previously mentioned memory devices that together form memory 206, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above. In some embodiments, the programs, modules, and data structures stored in memory 206, or the non-transitory computer readable storage medium of memory 206, provide instructions for implementing respective operations of the methods described below. In some embodiments, some or all of these modules may be implemented with specialized hardware circuits that subsume part or all of the module functionality.

Although FIG. 2A shows a management module 121, FIG. 2A is intended more as functional description of the various features which may be present in a management module than as a structural schematic of the embodiments described herein. In practice, and as recognized by those of ordinary skill in the art, items shown separately could be combined and some items could be separated. In some embodiments, one or more of the operations and/or modules of management module 121 may instead be performed and/or implemented by management module 111. In some embodiments, one or more of the operations and/or modules of management module 121 may instead be performed and/or implemented by NVM controllers 130. For example, in some embodiments, each NVM controller 130 includes garbage collection logic (e.g., similar to garbage collection module 220, FIG. 2A) for managing the data lifetime of corresponding NVM devices. In some embodiments, garbage collection module 220 may be implemented in whole or in part by software, hardware, firmware, or any combination thereof in data storage device 120 (FIG. 1B). Lifetime management operations may include, for example, garbage collection operations, data compaction operations, read disturb handling operations, and data scrubbing operations.

FIG. 2B is a block diagram illustrating a management module 111, in accordance with some embodiments, as shown in FIG. 1B. Management module 111 typically includes one or more processing units 230 (sometimes herein called CPUs, processors, or hardware processors, and sometimes implemented using microprocessors, microcontrollers, or the like) for executing modules, programs, and/or instructions stored in memory 236 and thereby performing processing operations, memory 236 (sometimes called main controller memory), and one or more communication buses 238 for interconnecting these components. The one or more communication buses 238 optionally include circuitry (sometimes called a chipset) that interconnects and controls communications between system components. Management module 111 is coupled to one or more hosts 101 by host interface 232 via an external fabric, and is coupled to storage device(s) 120 by storage device interface 234 via an internal fabric.

Memory 236 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. Memory 236 optionally includes one or more storage devices remotely located from CPU(s) 230. Memory 236, or alternatively the non-volatile memory device(s) within memory 236, comprises a non-transitory computer readable storage medium. In some embodiments, memory 236, or the non-transitory computer readable storage medium of memory 236 stores the following programs, modules, and data structures, or a subset or superset thereof:

- operating system 240 including procedures for handling various basic system services and for performing hardware dependent tasks;
- application(s) 242 including programs for facilitating and/or interacting with any of the modules of main controller 110 or host 101;
- data management module(s) 250 for performing data lifetime management operations as described herein, including:
  - one or more instances of a data management module 252, for running management operations on memory blocks (e.g., NVM devices 140) including:
    - individual request module 252-1 for requesting information identifying memory block candidates and related memory blocks, and for requesting usage information for the memory blocks of interest;
    - related block analysis module 252-2 for analyzing memory block candidates to determine related memory blocks, and for selecting groups of memory blocks for management operations; and
    - command module 252-3 for sending requests to respective storage devices (e.g., storage devices 120) regarding usage information of specified memory blocks; and
  - garbage collection module 254, which is a specific example or instance of a data management module 252, for running garbage collection on memory blocks (e.g., NVM devices 140) including:
    - individual request module 254-1 for requesting information identifying memory block candidates and related memory blocks, and for requesting usage information for the memory blocks of interest;
    - related block analysis module 254-2 for analyzing memory block candidates to determine related memory blocks, and for selecting groups of memory blocks for management operations; and
    - command module 254-3 for sending requests to respective storage devices (e.g., storage devices 120) regarding usage information of specified memory blocks.

Each of the data management modules 250, such as data management module 252 and garbage collection 254, is used to manage, and perform various tasks to extend, data lifetime of the storage medium in the data storage devices 120 of data storage system 100 (FIG. 1A).

Each of the above identified elements of management module 111 may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 236 may store a subset of the modules and data structures identified above. Furthermore, memory 236 may store additional modules and data structures not described above. In some embodiments, the programs, modules, and data structures stored in memory 236, or the non-transitory computer readable storage medium of memory 236, provide instructions for implementing some of the methods described below. In some embodiments, some or all of these modules may be implemented with specialized hardware circuits that subsume part or all of the module functionality.

Although FIG. 2B shows a management module 111, FIG. 2B is intended more as functional description of the various features which may be present in a management module than as a structural schematic of the embodiments described herein. In practice, and as recognized by those of ordinary skill in the art, items shown separately could be combined and some items could be separated. In some embodiments, one or more of the operations and/or modules of management module 111 may instead be performed and/or implemented by management module 121. In some embodiments, one or more of the operations and/or modules of management module 111 may instead be performed and/or implemented by NVM controllers 130. For example, management module 121 of storage device 120-1 includes data management logic (e.g., similar to data management module 252, FIG. 2B) for managing the data lifetime of memory blocks (e.g., memory devices 140) of one or more of the storage devices 120-2 through 120-N. In some embodiments, data management module 252 and garbage collection module 254 may be implemented in whole or in part by software, hardware, firmware, or any combination thereof in data storage system 100 (FIGS. 1A-1B).

As noted above, in some embodiments, main controller 110 is implemented by a host system (e.g., host 101, FIG. 1A) that also stores and accesses data in the plurality of storage devices 120 (e.g., see FIG. 1A). Furthermore, in some embodiments, main controller 110 is implemented by a storage device (e.g., storage device 120-1, FIG. 1A) in the multi-device storage environment. For example, it may be implemented as a part of storage controller 124.

Referring FIGS. 2C and 2D, the non-volatile storage devices 120-1 to 120-N in a data storage system 100 (FIG. 1A) can be used to store data using redundant data-based protection schemes, sometimes called Redundancy Coding, one example of which is RAID (redundant array of independent disks). Numerous types or levels of Redundancy Coding and RAID are well known, and the present document does not presume to fully describe all types or levels of Redundancy Coding and RAID, nor to describe new levels or types of Redundancy Coding. In some embodiments, for a given Redundancy Coding or RAID system, storage locations in storage devices 120-1 to 120-N are divided into Redundancy Coding stripes, each having storage locations in a predefined number, D, of data storage devices, such as 6 or 8 or 10 or other number. D is generally an integer equal to 2 or more, and is typically 4 or more, and more typically is equal to 6 or more or 8 or more.

In some embodiments, the sets of data storage devices in which the storage locations are located for various Redundancy Coding stripes (within a single data storage system 100) are overlapping. Stated another way, in many systems, the sets of data storage devices used to store Redundancy Coding Stripes A and B, or Redundancy Coding Stripes A1 to An, where n is an integer greater than 2, are overlapping. For example, a first Redundancy Coding stripe includes storage locations in data storage devices 120-1 to 120-s, a second Redundancy Coding stripe includes storage locations in data storage devices 120-2 to 120-s+1, a third Redundancy Coding stripe includes storage locations in data storage devices 120-3 to 120-s+2, and so on, where s is the number of data storage devices in each Redundancy Coding stripe.

In some Redundancy Coding levels or types, parity information is stored in just one data storage device for each Redundancy Coding stripe, whereas in some other Redundancy Coding levels or types, parity information is stored in two or more data storage devices for each Redundancy Coding stripe. For example, in FIG. 2C, each data storage device in which data is stored for a particular Redundancy Coding stripe is labelled "D", while each data storage device in which parity is stored is labelled "P". FIG. 2D schematically represents a storage system using a Redundancy Coding parity storage pattern of interest that includes both "local" and "global" parity values. In FIG. 2D, each data storage device in which data is stored for a particular Redundancy Coding stripe is labelled "D", each data storage device in which local parity is stored is labelled "LP", and the data storage device in which global parity is stored is labelled "GP". In systems of this latter type, herein called local/global Redundancy Coding systems, multiple Redundancy Coding sub-stripes 290 (e.g., sub-stripes 290-1 to 290-m) each have a local parity data storage device, labelled LP in FIG. 2D, (or, alternatively, two or more local parity data storage devices), and the set of multiple Redundancy Coding stripes also includes a global parity data storage device, labelled "GP" in FIG. 2D. The multiple Redundancy Coding sub-stripes 290 and the global parity data storage device together comprise a single Redundancy Coding stripe 292. When data is written to the Redundancy Coding stripe, both local parity and global values are generated. Parity generation and data recovery in local/global Redundancy Coding systems is discussed below. Since there are many Redundancy Coding levels or types and numerous variations in how those Redundancy Coding levels or types are implemented, further description of such Redundancy Coding levels and types is not provided herein, except as it may be relevant to the various embodiments of systems and methods for generating the parity information and storing data in systems that implement such Redundancy Coding levels or types.

As shown in FIG. 2B, the management subsystem 111 of a data storage system 100 may include a stripe map engine 260, which optionally includes or uses a stripe map 262, and more generally maps write data for any given write request to a Redundancy Coding stripe, which can be called the identified Redundancy Coding stripe. In some embodiments, stripe map engine 260 determines both a first data storage device within the identified Redundancy Coding stripe to which to write the data and a second data storage device within the identified Redundancy Coding stripe at which to compute parity data for data that includes the specified data to be written to the first data storage device.

The pattern or mapping method used to assign selected drives for parity generation may be static or dynamic. In some embodiments, the selected drive is randomly or pseudo-randomly selected from among the available drives. In some embodiments, the selected drive is changed on a rotating basis with each successive write or at regular or irregular intervals. Thus, in some embodiments, multiple selected drives operate in parallel to generate parity in accordance with a parity offload arrangement. Multiple selected drives operate in parallel to generate parity and propagate parity and/or data to other drives based on the stripe map in some embodiments.

In some embodiments, the stripe map for each stripe includes location information for all "chunks" in the stripe, including data chunks and one or more parity chunks. Each chunk corresponds to the physical space used to store data or parity in a single data storage device in the stripe. A chunk is typically a set of one or more blocks located on a single drive. In some embodiments, the location information for each chunk can be of the form (SSD, LBA) for each chunk, where SSD identifies the data storage device in which the chunk is stored, and LBA is (or identifies) the logical block address mapped to the location at the beginning of the chunk. Thus, in such embodiments, the stripe map for each stripe is of the form (SSD1, LBA1), (SSD2, LBA2), (SSDc, LBAc), where c is the number of chunks in the stripe. The stripe map optionally includes a stripe identifier, but in some embodiments the stripe identifier is inferred from the location (e.g., the entry number) of the stripe map in a table of stripe maps. Other forms of stripe maps may be used. Typically, the stripe map for each stripe contains the information needed to locate all data and parity in the stripe. In some embodiments, each stripe map is dynamically generated when space for the stripe is allocated in the data memory system 100 (FIG. 1A).

In some embodiments, the storage controller 124 or management module 121 (e.g., FIG. 2A) of each data storage device 120 that participates in using Redundancy Coding storage for data protection includes a Redundancy Coding parity module 224 for generating and storing parity values. While in some embodiments only a subset of the data storage devices 120 in the data storage system (e.g., storage system 100) have such a module, because only a subset of the data storage devices are used to compute and store parity, more typically parity computation and storage is spread across all the data storage devices in the system that participate in Redundancy Coding storage for data protection, so as to spread the parity computation load as evenly as possibly across all data storage devices in the storage system.

FIG. 3 illustrates an example implementation of an offloaded disaggregated storage architecture, in accordance with some embodiments. HA-RAID-BOF stands for High Availability (HA) Redundant Array of Inexpensive (or Independent) Disks (RAID) Bunch of Flash (BOF). As the name indicates, this example shows a bunch of flash drives, SSDs 304, in a Redundant Coding (RC) configuration, connected via an Internal Fabric 306 to facilitate high availability. The shaded portion of the Figure constitutes a main controller subsystem, in accordance with some embodiments. In some embodiments, one or more adapters or Storage Network Interface Cards (SNICs, 308) connect the subsystem to one or more hosts 330 via one or more external fabric 340. The example shows one or more Storage Virtualization Controllers (SVCs, 302-1 through 302-n) connected to one or more backend Solid Storage Devices (SSDs, 304-1 through 304-m) and one or more front end controllers (for e.g., Ethernet, Infiniband, PCIe) through one or more internal fabrics 306. In some embodiments, internal fabric 306 is PCIe or a similar fabric. In some embodiments, the SVCs (302-1 through 302-n) are a part of the front end controllers. Furthermore, in some embodiments, each SVC 302 contains an inexpensive CPU 312 to perform initialization, management and other similar slow path activities, and fast path automation hardware (HW Automation 314), e.g. implemented using one or more FPGA or ASIC devices, which completely handles fast path commands processing (e.g., data transfers between hosts 330 and backend SSDs 304), so that CPU 312 has little or no involvement in the processing of fast path commands (e.g., no involvement other than initializing or setting up the hardware 314 to handle the operations). In some embodiments, hardware automation 314 is omitted from a respective SVC 302 if the SVC 302 includes a CPU with sufficient power to perform the fast path commands. In some embodiments, each SVC 302 contains internal memory 316. Further, in some embodiments, each SVC 302 is attached to an external DRAM as shown.

In some embodiments, each SSD 304 is configured to support offloaded operations, as discussed in more detail below. Each SSD 304 has internal memory organized as one or more controller memory buffers (318, CMB). In some embodiments, SSDs 304 support peer-to-peer communications between the SSDs, so that the SSDs 304 can transfer data between themselves, such as for performing compaction during garbage collection, without external control. Each SSD 304 also has a flash management module that manages one or more non-volatile memory devices (NVMs) and performs various flash management operations for the respective SSDs. The offload service module 322 works in conjunction, or co-ordinates, with the flash management module to implement various offloading operations.

In some embodiments, one or more modules 322 perform offloaded services, offloaded from the one or more SVCs 302. Such offloaded services include global flash translation layer (FTL) addressing operations, parity computations (e.g., XOR, Reed-Solomon), Garbage Collection (GC) related functions, GC data transfers (via peer-to-peer communication), and other operations that are typically performed in the SVCs. Also, in some embodiments, operations that are delayed (e.g., part of stripe closing or garbage collection, to be executed in the future) are offloaded to the SSDs along with operations that require more immediate attention. With the support provided by their respective offload services modules 322, the SSDs 304 handle the offloaded operations in response to host commands, in accordance with some embodiments. Some SSDs have sufficient hardware and computational resources to support offloaded services, and only firmware changes are needed to implement the SSD portion of some of the embodiments described herein. The system architecture shown in FIG. 3 enables low cost disaggregated storage with nearly the same performance as backend SSDs, while supporting offloaded services, such as global FTL addressing, Line Speed Offloaded Coding (LSOC), write transactions, remapping, scale out, and Xcopy. The offloading of such services from hosts 330 using a storage system using the storage system architecture of FIG. 3 can lead to operational savings.

Additionally, as shown in FIG. 3, data traffic (shown as dashed lines, Data Path) and control traffic (shown as solid black lines, Control Path) are separated, in accordance with some embodiments. This separation leads to simpler design while enabling optimizations in the different paths. For example, control operations tend to be serial in nature, whereas data path operations are parallel in nature and are more amendable to parallel execution. Control path operations benefit from specialized hardware. Further, in some embodiments, data traffic bypasses the SVCs 302, enabling the SVCs to perform other operations, and/or reducing the complexity of the SVCs.

FIGS. 4A-4J illustrate a flowchart diagram of a method 400 of offloading data management requests, such as data read, data write, or data compaction requests, in a disaggregated storage system, in accordance with some embodiments. Method 400 is performed at a main controller subsystem, such as management subsystem 111, connected to a plurality of storage devices (e.g., storage devices 120 or SSDs 304) in a data storage subsystem of the multi-device storage environment, in accordance with some embodiments. The main controller subsystem is also called a controller system in some embodiments. Alternatively, the main controller subsystem is an NVMe controller, a storage virtualization controller, or a host device with embedded NVMe controller. In some embodiments, one of the SSDs acts as the main controller for the plurality of storage devices. Further, in some embodiments, the main controller subsystem includes a plurality of processors. The main controller system receives (402) a data management request from a host system (e.g., hosts 330) external to the multi-device storage environment, for example via an external fabric (e.g., 340). In some embodiments, the main controller subsystem includes (404) one or more network interface controllers (e.g., adapters 308). In some embodiments, the main controller subsystem includes (406) one or more storage virtualization controllers (e.g., controllers 302). Further, in some embodiments, the data management request includes (408) a request for encryption, compression, and/or redundant code computation. In some embodiments, hardware accelerators in the main controller subsystem perform one or more of these functions. In some such embodiments, one or more of these functions are performed by the data storage devices so as to offload these functions from the main controller subsystem.

The main controller subsystem determines (410), using a data management module (e.g., data management module 250 or individual request module 252-1), based on the data management request, one or more storage devices of the plurality of storage devices (e.g., SSDs 304) and one or more data management operations to be performed by the one or more storage devices, in accordance with some embodiments. In some embodiments, the main controller subsystem, in order to determine the one or more storage devices, receives (412) an input logical address from the host system (e.g., from any of hosts 330 via external fabric 340) and indexes a Drives Virtualization Table (DVT) (not shown), which maps logical addresses to storage devices, using the input logical address to identify the one or more storage devices (e.g., SSDs 304). In some such embodiments, the main controller subsystem uses at least a portion of the input logical address to identify the one or more storage devices. In some embodiments, the DVT or mapping tables in a respective SVC 302 are stored in the SVC memory 316 for faster access by the respective SVC 302.

Figure 4B:
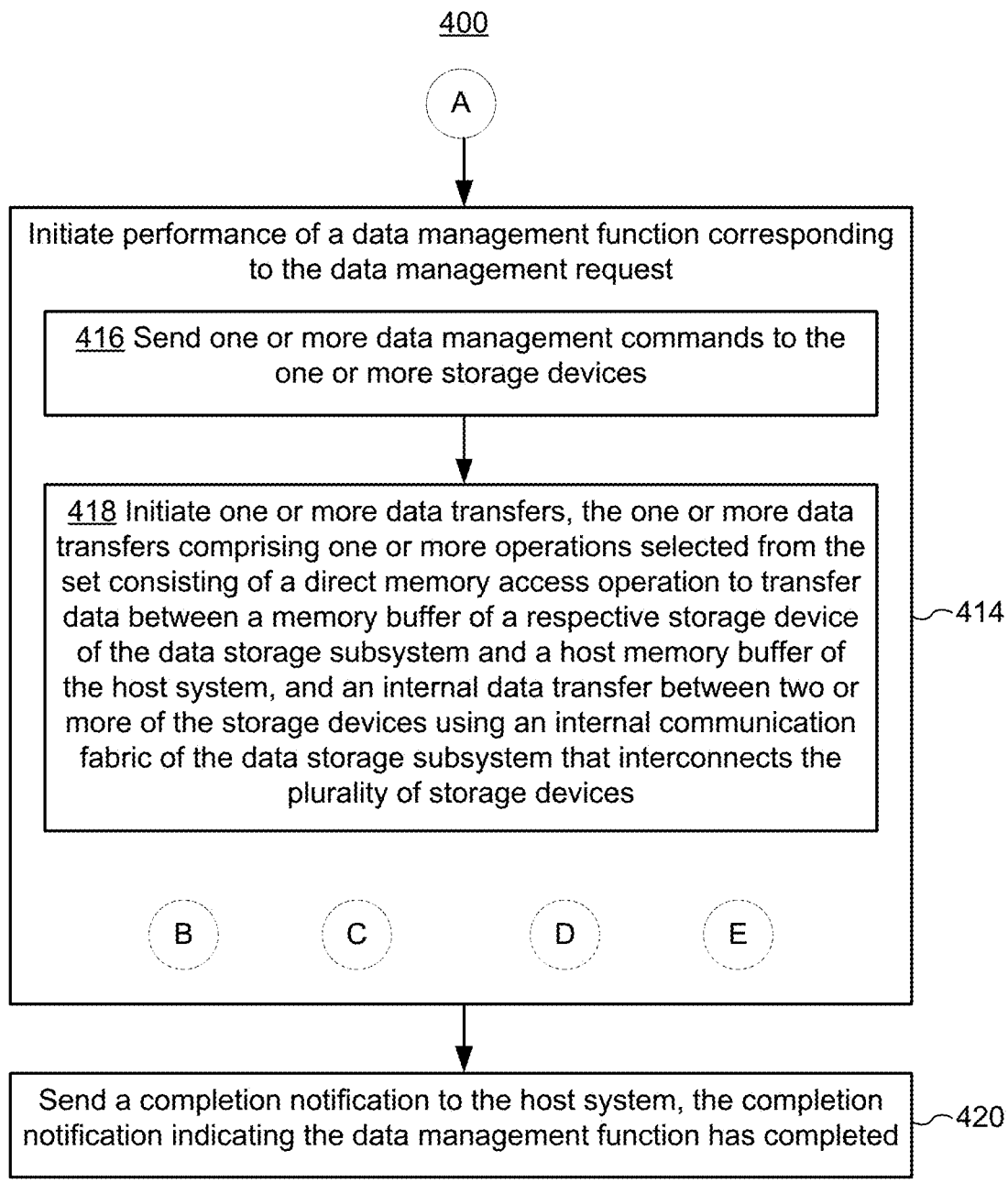

Further, as shown in FIG. 4B, the main controller subsystem initiates (414) performance of a data management function corresponding to the data management request, in accordance with some embodiments. In some embodiments, one or more data management modules (e.g., module 252) in the main controller subsystem, such as in subsystem 111, uses a command module (e.g., module 252-3) to initiate performance of the data management function at one of the storage devices. In some embodiments, the initiation step (414) includes sending (416) one or more data management commands to the one or more storage devices, and initiating (418) one or more data transfers (either before or after sending the one or more data management commands). The one or more data transfers include one or more operations selected from the set consisting of a direct memory access operation to transfer data between a memory buffer of a respective storage device of the data storage subsystem and a host memory buffer of the host system (e.g., using an external fabric 340), and an internal data transfer between two or more of the storage devices using an internal communication fabric of the data storage subsystem, such as the internal fabric in FIG. 2B or the internal fabric 306 in FIG. 3, that interconnects the plurality of storage devices. In some embodiments, the direct memory access operation is hardware-assisted. In some embodiments, the one or more data transfers includes a direct memory access operation to transfer data between a memory buffer of a respective storage device of the data storage subsystem and a host memory buffer of the host system, and/or an internal data transfer between two or more of the storage devices using an internal communication fabric of the data storage subsystem that interconnects the plurality of storage devices.

Figure 4C:
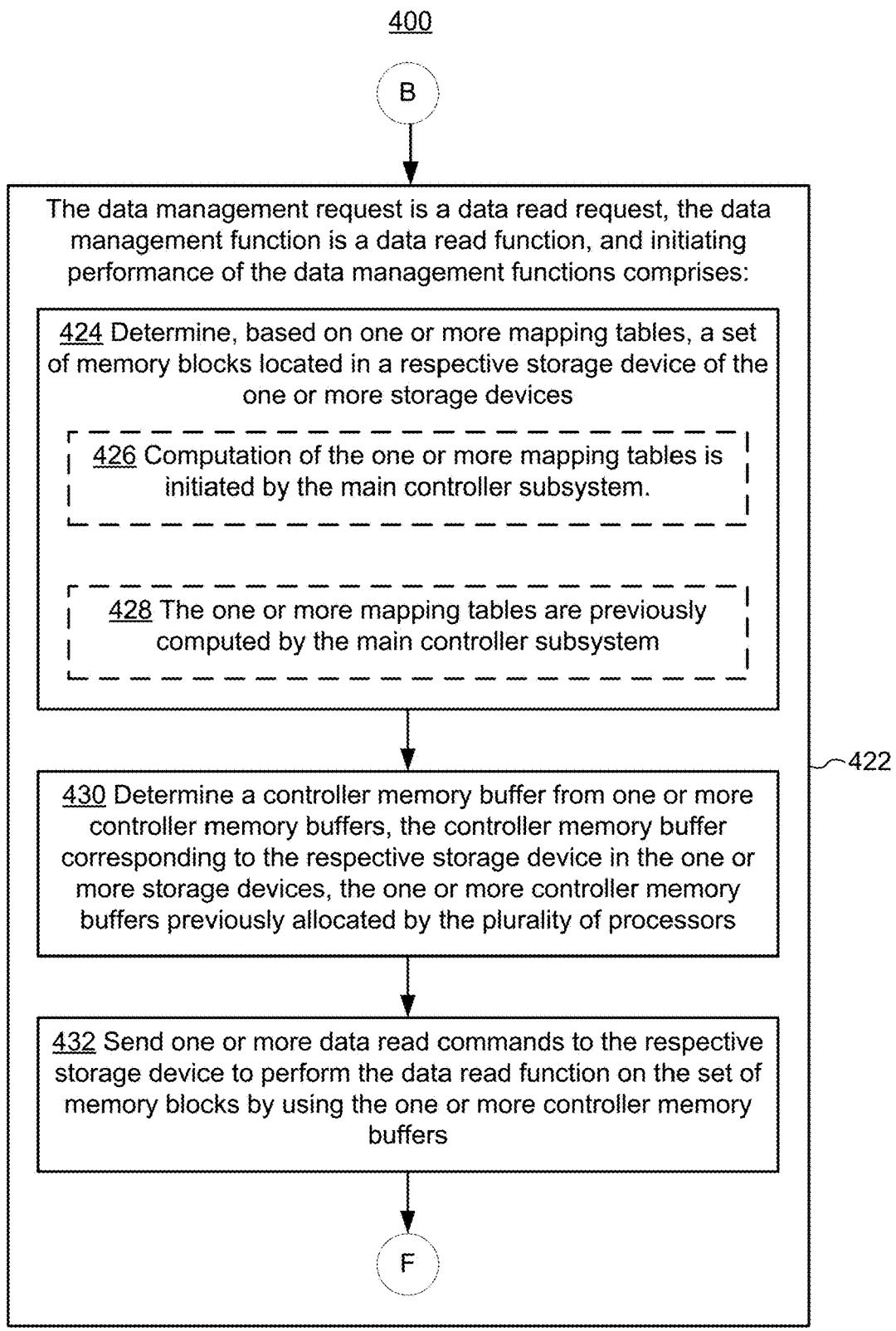
Figure 4D:
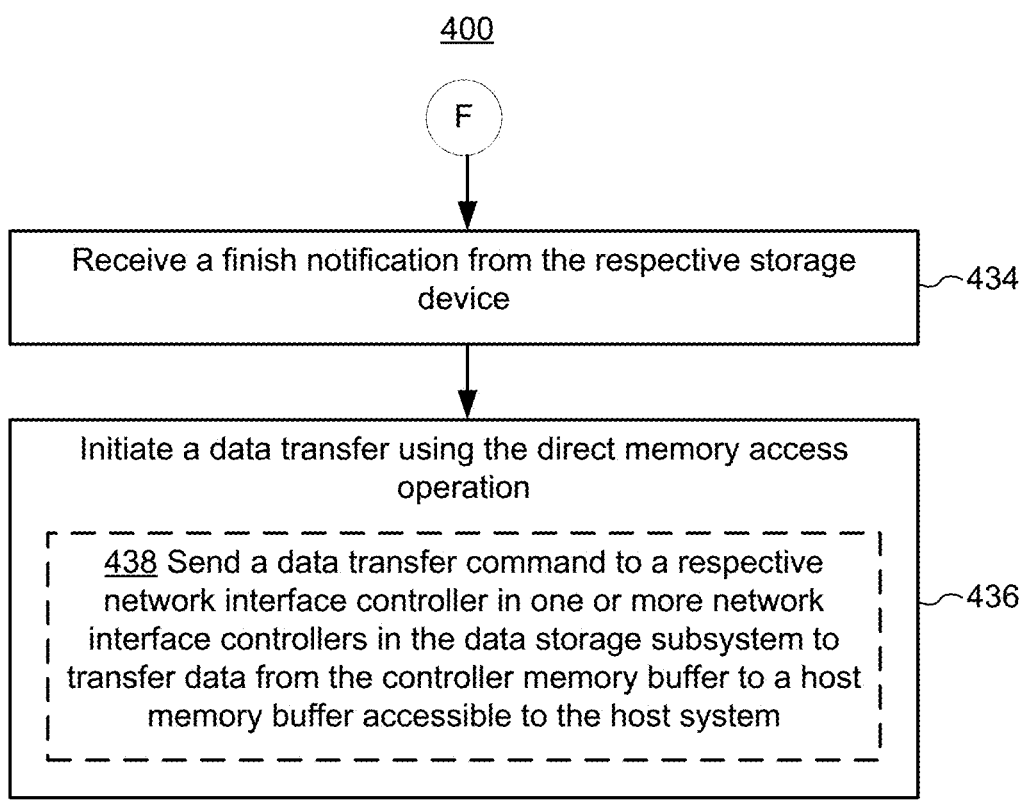

FIGS. 4C-4J illustrate different cases of data management request offloads, in accordance with some embodiments. FIGS. 4C and 4D correspond to offloading data read requests, FIGS. 4E-4G and 4H-4I correspond to offloading data write requests, and FIG. 4J corresponds to offloading data compaction requests. Each of the different cases is described in more detail below.

FIGS. 4C and 4D illustrate offloading of a data read request, in accordance with some embodiments. More specifically, when the main controller subsystem receives from a host, such as one hosts 330, a data management request that is a data read request, the data management function is a data read function, and the main controller subsystem initiates performance (422) of the data read function, in accordance with some embodiments. In some embodiments, the data management function includes a data read function and other operations or functions. In some embodiments, the main controller subsystem determines (424), based on one or more mapping tables (e.g., one or more DVT), a set of memory blocks located in a respective storage device of the one or more storage devices.

In some embodiments, the set of memory blocks comprises one or more memory blocks. In some embodiments, the one or more mapping tables map one or more global logical addresses, identified by the data read request (received from the host), to one or more storage devices in the plurality of storage devices, and optionally to one or more local logical addresses in each such storage device. The local logical addresses are mapped, by the individual storage devices, to physical addresses in those storage devices using logical to physical (L2P) mapping mechanisms in those storage devices. In some embodiments, the main controller subsystem uses a related block analysis module (e.g., module 252-2) for determining the set of memory blocks. In some embodiments, the main controller subsystem computes (428) the one or more mapping tables ahead of receiving the data management request. In other embodiments, the main controller subsystem initiates (426) the computation of the one or more mapping tables. In some embodiments, the mapping tables are computed by one or more devices external to the main controller subsystem. In some embodiments, the mapping tables are stored/located in the storage devices, with portions stored in controller memory buffers (CMBs) of the main controller subsystem for fast access.

Further, in some embodiments, the main controller subsystem determines (e.g., selects) a controller memory buffer from one or more controller memory buffers (e.g., CMBs 318), the controller memory buffer corresponding to (e.g., dynamically allocated to or assigned to) the respective storage device in the one or more storage devices. In some embodiments, the one or more controller memory buffers (e.g., CMBs) are previously allocated by the plurality of processors (e.g., CPUs 312), prior to the main controller subsystem receiving the data management request from the host. The main controller subsystem sends (432) one or more data read commands, using a command module (e.g., module 252-3), to the respective storage device to perform the data read function on the set of memory blocks by using the one or more controller memory buffers, in accordance with some embodiments. In some embodiments, the main controller subsystem translates (e.g., using command module 252-3) the data read request received from the host system into the one or more data read commands, using a predefined command translation process.

In some embodiments, a data read modules (e.g., module 214) of the respective storage device responds to the one or more data read commands by reading the corresponding data. In some embodiments, the main controller subsystem receives (434), using a command module (e.g., module 252-3), a finish notification from the respective storage device that indicates the execution of the data read command sent to the respective storage device is complete, and that the resulting read data is stored in a memory buffer of the storage device's controller. After receiving the finish notification, the main controller subsystem initiates a data transfer using a direct memory access operation, to transfer the read data to the host that sent the data read request, in accordance with some embodiments. In some embodiments, initiating the data transfer includes the main controller subsystem sending a data transfer command to a respective network interface controller in one or more network interface controllers (e.g., controllers 308) in the data storage subsystem to transfer data (e.g., read data) from the controller memory buffer to a host memory buffer accessible to the host system (e.g., hosts 330), using direct memory access (DMA) or remote direct memory access (RDMA) to transfer the read data.

Figure 4E:
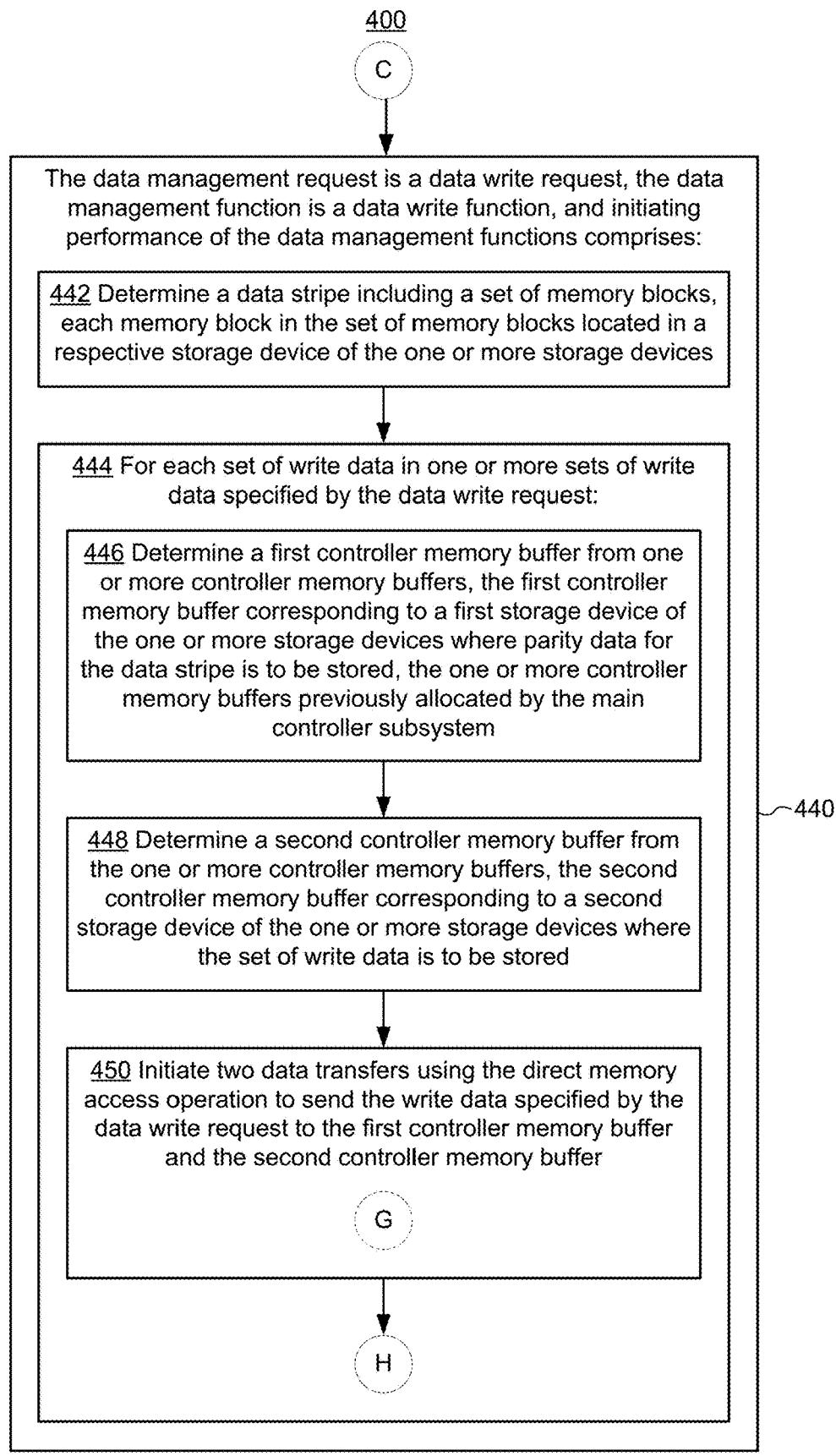
Figure 4F:
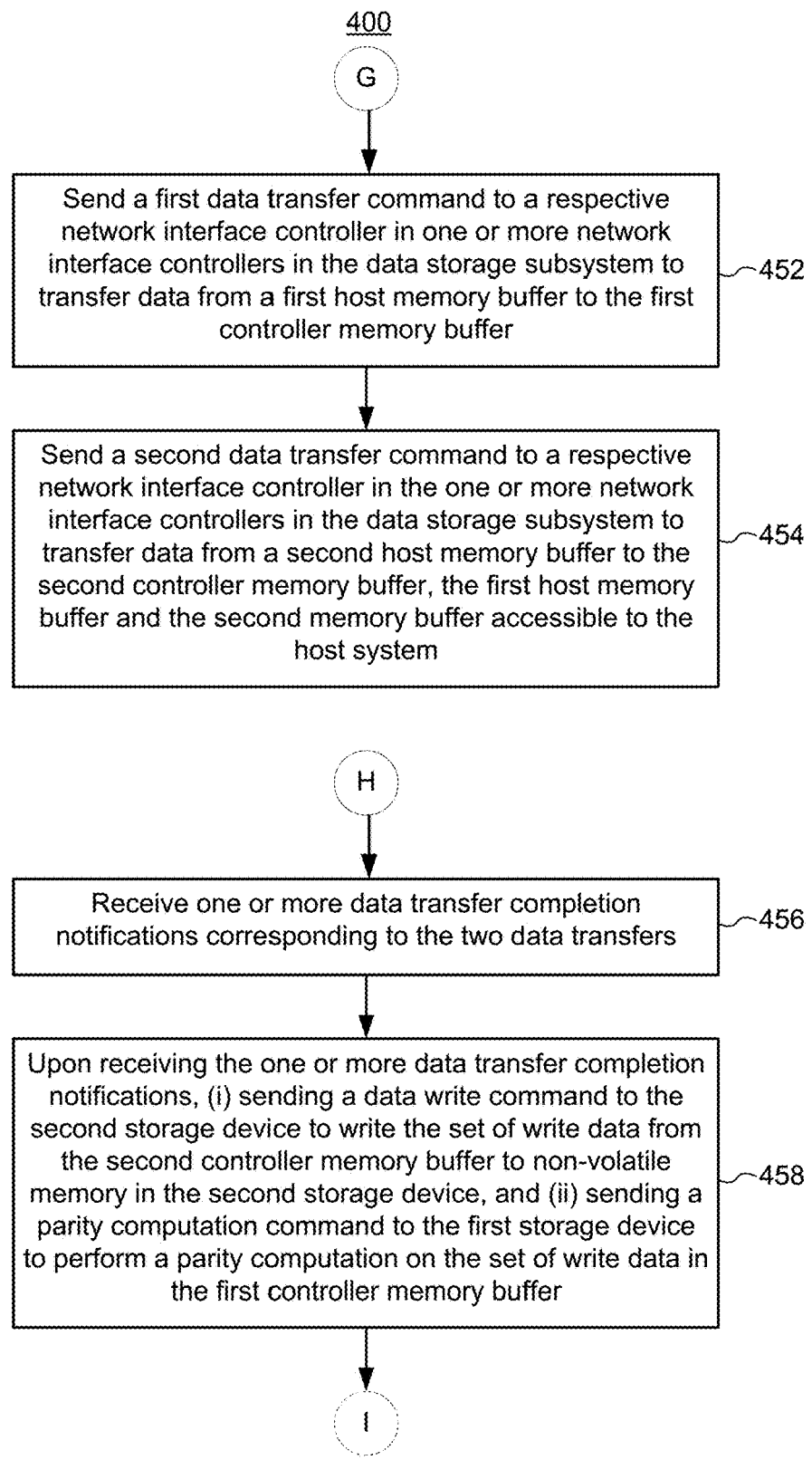
Figure 4G:
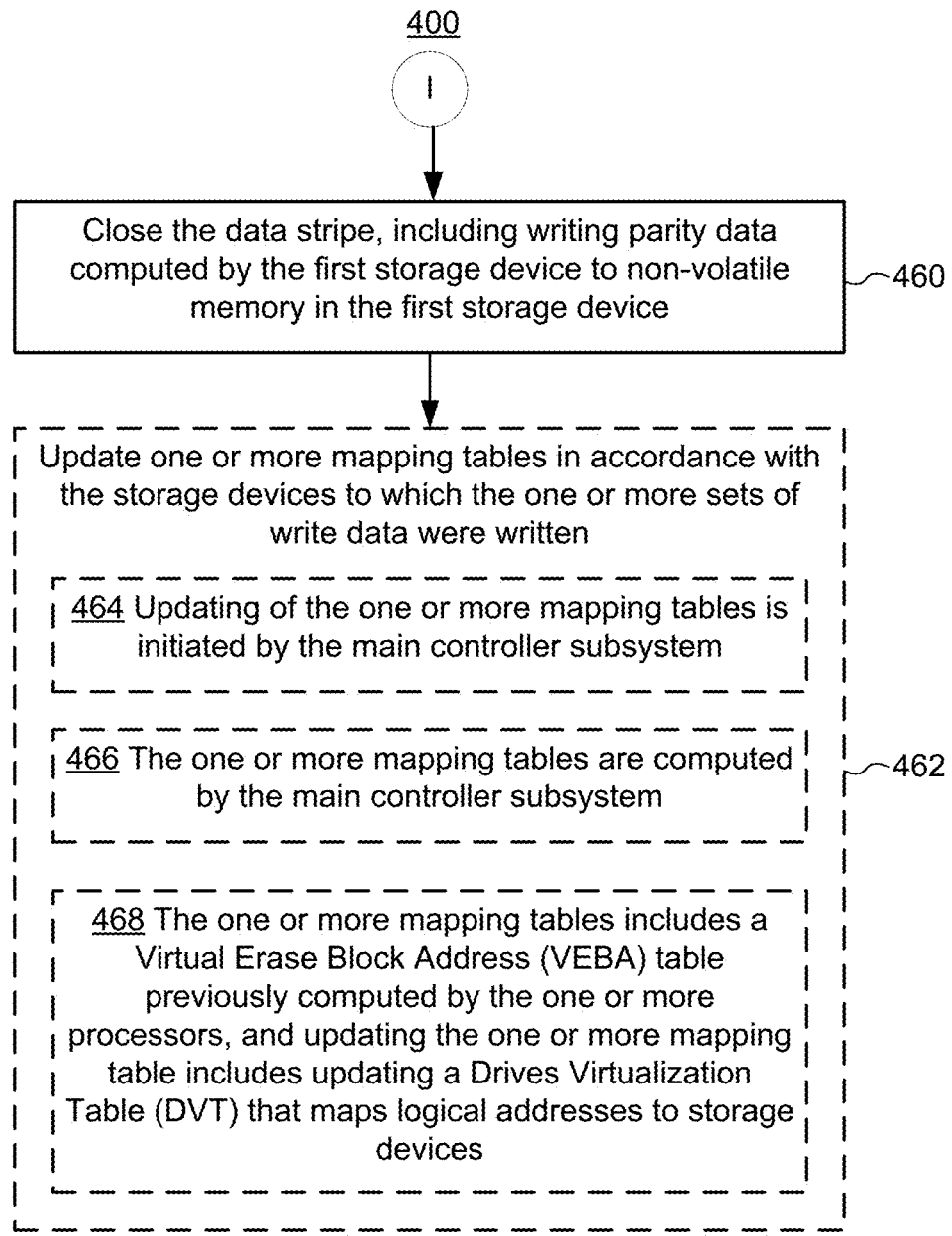

FIGS. 4E-4G illustrate a way to offload data write requests, in accordance with some embodiments. More specifically, when the main controller subsystem receives from a host, such as any one of hosts 330, a data management request that is a data write request, the data management function is a data write function, and the main controller subsystem initiates performance (440) of the data write function, in accordance with some embodiments. In some embodiments, the main controller subsystem determines (442), using a module such as related block analysis module 252-2, a data stripe including a set of memory blocks, each memory block in the set of memory blocks located in a respective storage device of the one or more storage devices (e.g., devices 120 or SSDs 304).

The main controller subsystem performs a sequence of operations (444) for each set of write data in one or more sets of write data specified by the data write request, in accordance with some embodiments. The sequence of operations includes determining (446) (e.g., selecting) a first controller memory buffer from one or more controller memory buffers (e.g., buffers 318), the first controller memory buffer corresponding to (e.g., dynamically allocated to or assigned to) a first storage device of the one or more storage devices where parity data for the data stripe is to be stored. Optionally, the one or more controller memory buffers are allocated by the main controller subsystem prior to initiating performance of the data management function. In some embodiments, the sequence of operations (444) further includes determining (448) a second controller memory buffer from the one or more controller memory buffers, the second controller memory buffer corresponding to a second storage device of the one or more storage devices where the set of write data is to be stored. In some embodiments, the first and second controller memory buffers, and the second storage device may be different for each set of write data. In some embodiments, the sequence of operations (444) further includes initiating (450) two data transfers using the direct memory access operation to send the write data specified by the data write request to the first controller memory buffer and the second controller memory buffer. In some embodiments, the main controller subsystem uses multicast DMA command to transfer the data to both memory buffers with a single command. Further, in some embodiments, initiating the two data transfers includes sending (452) a first data transfer command to a respective network interface controller in one or more network interface controllers (e.g., controllers 308) in the data storage subsystem to transfer data from a first host memory buffer to the first controller memory buffer, and to send (454) a second data transfer command to a respective network interface controller in the one or more network interface controllers (e.g., controllers 308) in the data storage subsystem to transfer data from a second host memory buffer to the second controller memory buffer, where the first host memory buffer and the second host memory buffer are accessible to the host system.

In some embodiments, the main memory subsystem uses a command module (e.g., module 252-3) to initiate the first and the second data transfer commands. In some embodiments, the main controller subsystem uses the hardware assisted direct memory access operation for the two data transfers. Further, in some embodiments, the first host memory buffer and the second host memory buffer are one and the same. Stated another way, in some embodiments, the second data transfer command is configured to transfer data from the first host memory buffer to the second controller memory buffer, thereby transferring data from the first host memory buffer to both the first controller memory buffer and the second controller memory buffer.

The sequence of operations (444) further includes receiving (456) one or more data transfer completion notifications corresponding to the two data transfers, in accordance with some embodiments. In some embodiments, the completion notifications are received from the one or more network interface controllers (e.g., controllers 308). Further, upon receiving the one or more data transfer completion notifications, the main controller subsystem (i) sends a data write command, using a command module (e.g., module 252-3), to the second storage device to write the set of write data from the second controller memory buffer to non-volatile memory in the second storage device, and (ii) sends a parity computation command, again using a command module (e.g., module 252-3), to the first storage device to perform a parity computation on the set of write data in the first controller memory buffer, as denoted by step 458. Optionally, the data write command and parity computation command are sent concurrently, or the parity computation command is sent before the data write command. In some embodiments, if parity information has previously been computed by the first storage device, e.g., for a different portion of the same memory block to which the write data is being written, that parity information is updated by the first storage device with the write data in the first controller memory buffer. In some embodiments, after sending the data write command and parity computation command, the main controller subsystem receives one or more finished notifications from the first storage device and the second storage device.

In some embodiments, the sequence of operations (444) further includes closing (460) the data stripe, including writing parity data computed by the first storage device to non-volatile memory in the first storage device. In some embodiments, the main controller subsystem initiates the writing of parity data temporarily stored in a memory buffer of the first storage device, such as from CMB NVRAM to non-volatile memory (e.g., flash memory) in the first storage device.

Further, in some embodiments, the sequence of operations (444) also includes updating (462) one or more mapping tables (in the SVC memory 316, for example) in accordance with the storage devices to which the one or more sets of write data were written. In some embodiments, the main controller system initiates (464), but does not perform, the update of the one or more mapping tables. In some such embodiments, the mapping tables are computed and updated by one or more devices external to the main controller subsystem. In some such embodiments, the mapping tables are stored/located in the storage devices, with portions stored in CMBs of the main controller subsystem for fast access. In some embodiments, the mapping tables are computed (466) by the main controller subsystem. Further, in some embodiments, the one or more mapping tables includes (468) a Virtual Erase Block Address (VEBA) table previously computed by the main controller subsystem, and updating the one or more mapping table includes updating a Drives Virtualization Table (DVT) that maps logical addresses (e.g., logical addresses in the logical address space of one or more host systems) to storage devices.

Figure 4H:
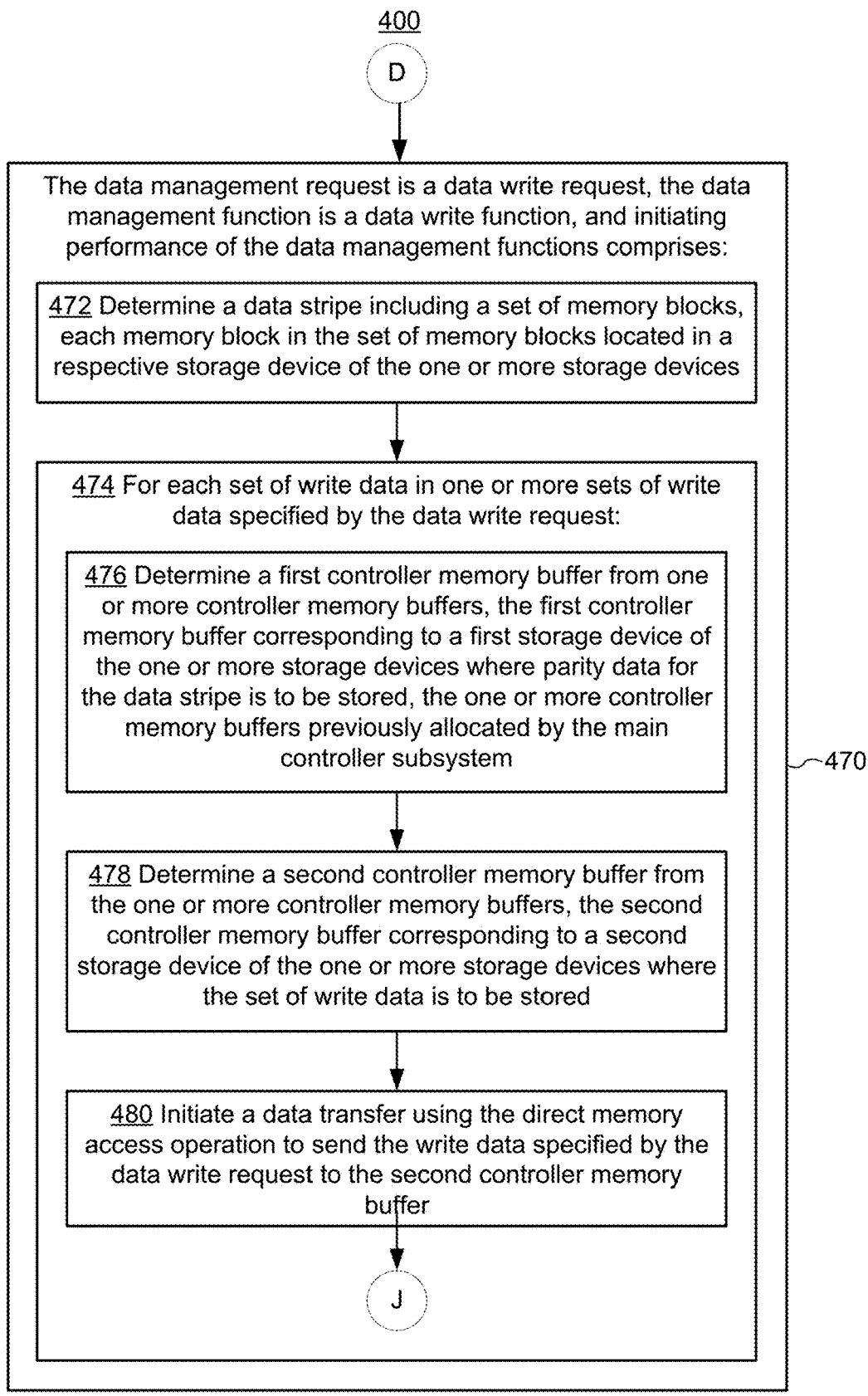
Figure 4I:
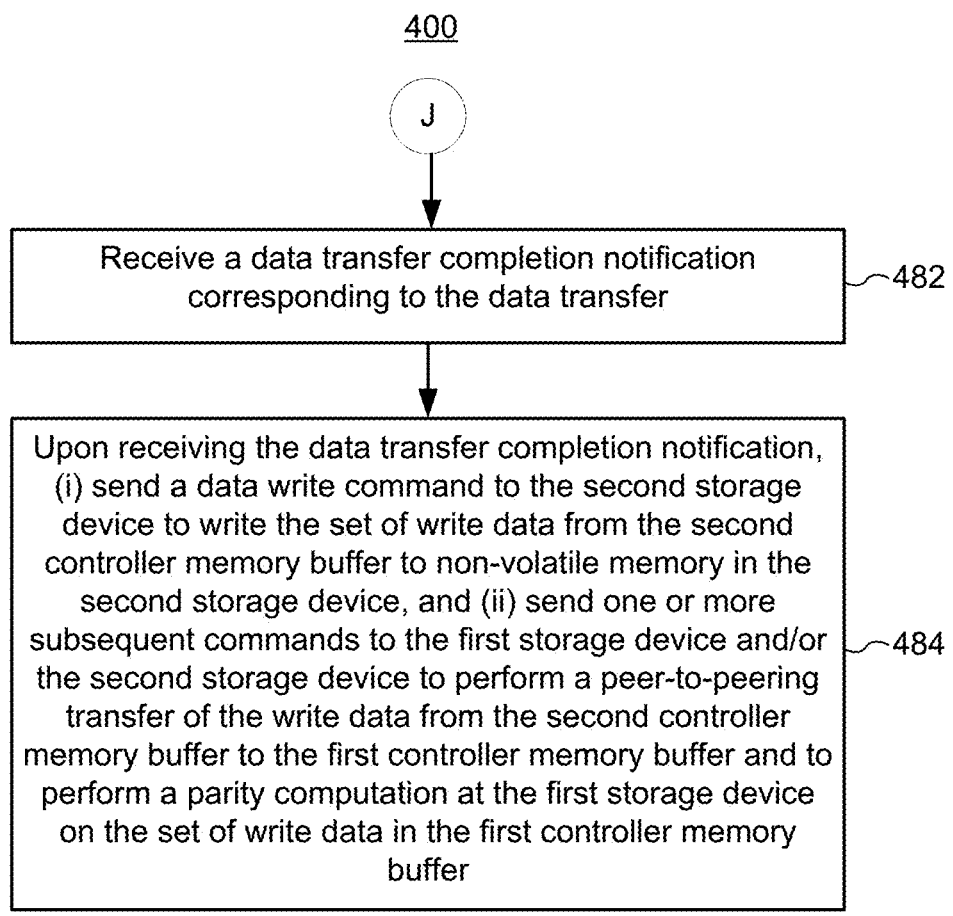

FIGS. 4H-4I illustrate another way to offload data write requests, in accordance with some embodiments. The initial set of steps are identical between FIGS. 4E and 4H. Specifically, steps 470, 472, 474, 476, and 478 correspond to steps 440, 442, 444, 446, and 448 respectively, and are described above with reference to FIG. 4E. What is different with this alternative is, instead of initiating (450) two data transfers using the direct memory access operation to send the write data specified by the data write request to the first controller memory buffer and the second controller memory buffer, the main controller subsystem initiates (480) a data transfer using the direct memory access operation to send the write data specified by the data write request to the second controller memory buffer transfer, in accordance with some embodiments. In some embodiments, the main controller subsystem receives (482) a data transfer completion notification corresponding to the data transfer. Further, in some embodiments, upon receiving the data transfer completion notification, the main controller subsystem (i) sends a data write command, using a command module (e.g., module 252-3), to the second storage device to write the set of write data from the second controller memory buffer to non-volatile memory in the second storage device, and (ii) sends one or more subsequent commands, also using a command module (e.g., module 252-3), to the first storage device and/or the second storage device to perform a peer-to-peer transfer of the write data from the second controller memory buffer to the first controller memory buffer and to perform a parity computation at the first storage device on the set of write data in the first controller memory buffer, as shown in 484.

Two examples are provided for further illustration. In a first example, the one or more subsequent commands are a peer-to-peer transfer command to the second storage device to send the write data to the first storage device, and a parity computation command that is set to the first storage device after the peer-to-peer transfer is completed. In a second example, the one or more subsequent commands are combined transfer and parity computation command sent to the first storage device to pull in a copy of the write data from the second controller memory buffer and then to compute or update parity using the transferred copy of the write data.

Further, in some such embodiments, if any parity information has already been written to the memory block in the first storage device, it is updated with the write data in the first controller memory buffer. Also, in some embodiments, after sending the write and parity computation commands, the main controller subsystem receives one or more finished notifications from the first storage device and the second storage device.

Figure 4J:
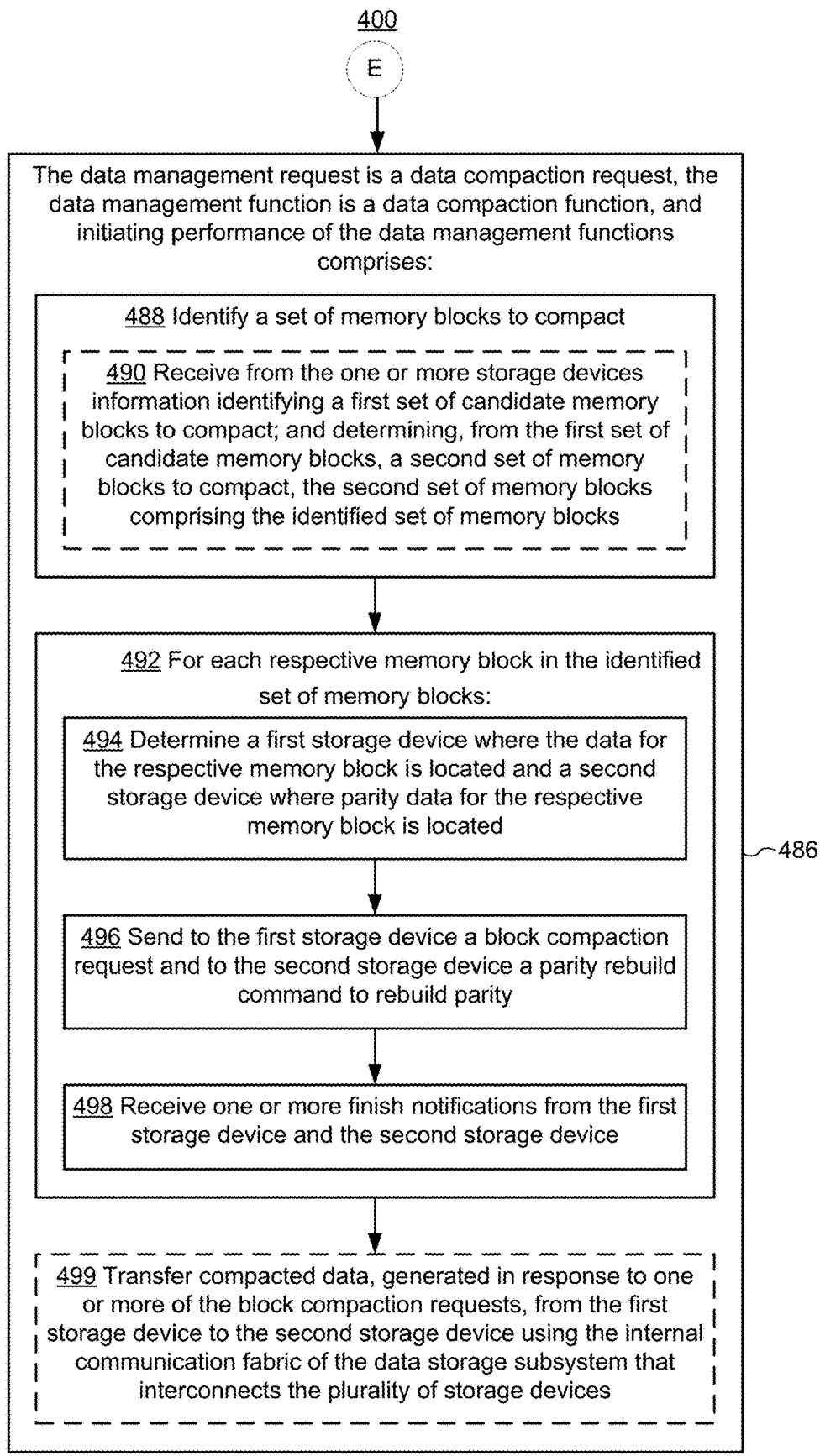

FIG. 4J illustrates a way to offload data compaction requests, in accordance with some embodiments. More specifically, when the main controller subsystem receives from a host, such as any of hosts 330, a data management request that is a data compaction request, the data management function is a data compaction function, and the main controller subsystem initiates performance (486) of the data compaction function, in accordance with some embodiments. In some embodiments, the main controller subsystem identifies (488), using a module such as the garbage collection module 254 or the superblock analysis module 254-2, a set of memory blocks to compact. In some embodiments, to identify the set of memory blocks to compact, the main controller subsystem receives (490) from the one or more storage devices information identifying a first set of candidate memory blocks to compact, and determines, from the first set of candidate memory blocks, a second set of memory blocks to compact, the second set of memory blocks including a subset of the identified set of memory blocks. For example, in some embodiments, the main controller subsystem selects as the second set of memory blocks those candidate memory blocks that have the least valid data, or alternatively selects, from among all the data stripes that include one or more of the candidate memory blocks, the data stripe having the least valid data, and includes all the blocks in the selected data stripe in the second set of memory blocks.

After identifying the set of memory blocks to compact, the main controller subsystem repeats a sequence of operations (492) for each respective memory block in the identified set of memory blocks, in accordance with some embodiments. More specifically, in some embodiments, the sequence of operations (492) includes determining (494), using a data management module (e.g., module 252), a first storage device where the data for the respective memory block is located and a second storage device where parity data for the respective memory block is located, sending (496) to the first storage device a block compaction request and to the second storage device a parity rebuild command to rebuild parity, and receiving (498) one or more finish notifications from the first storage device and the second storage device. Further, in some embodiments, in response to receiving the data compaction request, the main controller subsystem transfers (499) compacted data, generated in response to one or more of the block compaction requests, from the first storage device to the second storage device using the internal communication fabric (e.g., fabric 306) of the data storage subsystem that interconnects the plurality of storage devices (e.g., SSDs 304).

Once the data management function is completed, the main controller subsystem sends (420) a completion notification to the host system, the completion notification indicating the data management function has completed, in accordance with some embodiments.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the claims to the precise forms disclosed. Many modifications and variations are possible in view of the above teachings. The implementations were chosen and described in order to best explain principles of operation and practical applications, to thereby enable others skilled in the art.

What is claimed is:

1. A method of offloading data management functions in a multi-device storage environment, the method comprising:
   at a main controller subsystem connected to a plurality of storage devices in a data storage subsystem of the multi-device storage environment:
      receiving a data write request from a host system external to the multi-device storage environment;
      determining, based on the data write request, one or more storage devices of the plurality of storage devices and one or more data management commands to be performed by the one or more storage devices; and
      initiating performance of a data write function corresponding to the data write request, including:
         sending the one or more data management commands to the one or more storage devices thereby causing a respective storage device to perform a plurality of data transfers, the plurality of data transfers comprising:
            a first data transfer including a direct memory access operation to transfer data between a memory buffer of the respective storage device of the data storage subsystem and a host memory buffer of the host system performed in response to receiving the one or more data management commands from the main controller subsystem, and a second data transfer including an internal data transfer between two or more of the storage devices using an internal communication fabric of the data storage subsystem that interconnects the plurality of storage devices performed in response to receiving the one or more data management commands from the main controller subsystem;

determining a data stripe including a set of memory blocks, each memory block in the set of memory blocks located in a respective storage device of the one or more storage devices;

after determining the data stripe, for each set of write data in one or more sets of write data specified by the data write request:

determining a first controller memory buffer from one or more controller memory buffers, the first controller memory buffer corresponding to a first storage device of the one or more storage devices where parity data for the data stripe is to be stored, determining a second controller memory buffer from the one or more controller memory buffers, the second controller memory buffer corresponding to a second storage device of the one or more storage devices where the set of write data is to be stored;

after determining the first controller memory buffer and the second controller memory buffer, initiating two data transfers using the direct memory access operation to send the write data specified by the data write request to the first controller memory buffer and the second controller memory buffer, and after initiating the two data transfers, receiving one or more data transfer completion notifications corresponding to the two data transfers; and sending a completion notification to the host system, the completion notification indicating the data write function has completed.

2. The method of claim 1, wherein initiating performance of the data write function further comprises:

upon receiving the one or more data transfer completion notifications, (i) sending a data write command to the second storage device to write the set of write data from the second controller memory buffer to non-volatile memory in the second storage device, and (ii) sending a parity computation command to the first storage device to perform a parity computation on the set of write data in the first controller memory buffer.

3. The method of claim 2, wherein initiating the two data transfers using the direct memory access operation comprises:

sending a first data transfer command to a respective network interface controller, of one or more network interface controllers in the data storage subsystem, to transfer data from a first host memory buffer to the first controller memory buffer; and sending a second data transfer command to a respective network interface controller in the one or more network interface controllers in the data storage subsystem to transfer data from a second host memory buffer to the second controller memory buffer, the first host memory buffer and the second host memory buffer accessible to the host system.

4. The method of claim 2, further comprising closing the data stripe, including writing parity data computed by the first storage device to non-volatile memory in the first storage device.

5. The method of claim 2, further comprising updating one or more mapping tables in accordance with the storage devices to which the one or more sets of write data were written.

6. The method of claim 5, wherein updating of the one or more mapping tables is initiated by the main controller subsystem.

7. The method of claim 5, wherein the one or more mapping tables are computed by the main controller subsystem.

8. The method of claim 5, wherein:

the one or more mapping tables includes a Virtual Erase Block Address (VEBA) table previously computed by the main controller subsystem; and updating the one or more mapping tables includes updating a Drives Virtualization Table (DVT) that maps logical addresses to storage devices.

9. The method of claim 1, wherein the data write function includes encryption, compression, and/or redundant code computation.

10. A main controller subsystem configured to connect to a plurality of storage devices in a data storage subsystem of a multi-device storage environment, the main controller subsystem comprising:

means for receiving a data write request from a host system external to the multi-device storage environment;

means for determining, based on the data write request, one or more storage devices of the plurality of storage devices and one or more data management commands to be performed by the one or more storage devices; and means for initiating performance of a data write function corresponding to the data write request, including:

means for sending the one or more data management commands to the one or more storage devices thereby causing a respective storage device to perform a plurality of data transfers, the plurality of data transfers comprising:

a first data transfer including a direct memory access operation to transfer data between a memory buffer of the respective storage device of the data storage subsystem and a host memory buffer of the host system performed in response to receiving the one or more data management commands from the main controller subsystem, and a second data transfer including an internal data transfer between two or more of the storage devices using an internal communication fabric of the data storage subsystem that interconnects the plurality of storage devices performed in response to receiving the one or more data management commands from the main controller subsystem;

means for determining a data stripe including a set of memory blocks, each memory block in the set of memory blocks located in a respective storage device of the one or more storage devices, and after determining the data stripe, for each set of write data in one or more sets of write data specified by the data write request:

determining a first controller memory buffer from one or more controller memory buffers, the first controller memory buffer corresponding to a first storage device of the one or more storage devices where parity data for the data stripe is to be stored;

determining a second controller memory buffer from the one or more controller memory buffers, the second controller memory buffer corresponding to a second storage device of the one or more storage devices where the set of write data is to be stored;

after determining the first controller memory buffer and the second controller memory buffer, initiating two data transfers using the direct memory access operation to send the write data specified by the data write request to the first controller memory buffer and the second controller memory buffer; and after initiating the two data transfers, receiving one or more data transfer completion notifications corresponding to the two data transfers, and means for sending a completion notification to the host system, the completion notification indicating the data write function has completed.

11. A non-transitory computer readable storage medium storing one or more programs configured for execution by a memory controller configured to be coupled to a plurality of storage devices in a data storage subsystem of a multi-device storage environment, the one or more programs comprising instructions that, when executed by one or more processors of the memory controller; cause the memory controller to:

receive a data write request from a host system external to the multi-device storage environment;

determine, based on the data write request, one or more storage devices of the plurality of storage devices and one or more data management commands to be performed by the one or more storage devices; and initiate performance of a data write function corresponding to the data write request, including:

sending the one or more data management commands to the one or more storage devices thereby causing a respective storage device to perform a plurality of data transfers, the plurality of data transfers comprising:

a first data transfer including a direct memory access operation to transfer data between a memory buffer of the respective storage device of the data storage subsystem and a host memory buffer of the host system performed in response to receiving the one or more data management commands from a main controller subsystem, and a second data transfer including an internal data transfer between two or more of the storage devices using an internal communication fabric of the data storage subsystem that interconnects the plurality of storage devices performed in response to receiving the one or more data management commands from the main controller subsystem;

determining a data stripe including a set of memory blocks, each memory block in the set of memory blocks located in a respective storage device of the one or more storage devices;

after determining the data stripe; for each set of write data in one or more sets of write data specified by the data write request:

determining a first controller memory buffer from one or more controller memory buffers, the first controller memory buffer corresponding to a first storage device of the one or more storage devices where parity data for the data stripe is to be stored;

determining a second controller memory buffer from the one or more controller memory buffers, the second controller memory buffer corresponding to a second storage device of the one or more storage devices where the set of write data is to be stored;

after determining the first controller memory buffer and the second controller memory buffer, initiating two data transfers using the direct memory access operation to send the write data specified by the data write request to the first controller memory buffer and the second controller memory buffer; and after initiating the two data transfers, receiving one or more data transfer completion notifications corresponding to the two data transfers; and sending a completion notification to the host system, the completion notification indicating the data write function has completed.

12. The non-transitory computer readable storage medium of claim 11, wherein initiating performance of the data write function further comprises:

upon receiving the one or more data transfer completion notifications, (i) sending a data write command to the second storage device to write the set of write data from the second controller memory buffer to non-volatile memory in the second storage device, and (ii) sending a parity computation command to the first storage device to perform a parity computation on the set of write data in the first controller memory buffer.

13. The non-transitory computer readable storage medium of claim 12, wherein initiating the two data transfers using the direct memory access operation comprises:

sending a first data transfer command to a respective network interface controller, of one or more network interface controllers in the data storage subsystem, to transfer data from a first host memory buffer to the first controller memory buffer; and sending a second data transfer command to a respective network interface controller in the one or more network interface controllers in the data storage subsystem to transfer data from a second host memory buffer to the second controller memory buffer, the first host memory buffer and the second host memory buffer accessible to the host system.

14. The non-transitory computer readable storage medium of claim 12, wherein the one or more programs further comprise instructions that cause the memory controller to close the data stripe, including writing parity data computed by the first storage device to non-volatile memory in the first storage device.

15. The non-transitory computer readable storage medium of claim 12, wherein the one or more programs further comprise instructions that cause the memory controller to update one or more mapping tables in accordance with the storage devices to which the one or more sets of write data were written.

16. The non-transitory computer readable storage medium of claim 15, wherein updating of the one or more mapping tables is initiated by the main controller subsystem.

17. The non-transitory computer readable storage medium of claim 15, wherein the one or more mapping tables are computed by the main controller subsystem.

18. The non-transitory computer readable storage medium of claim 15, wherein:

the one or more mapping tables includes a Virtual Erase Block Address (VEBA) table previously computed by the main controller subsystem; and updating the one or more mapping tables includes updating a Drives Virtualization Table (DVT) that maps logical addresses to storage devices.

19. The non-transitory computer readable storage medium of claim 11, wherein the data write function includes encryption, compression, and/or redundant code computation.

* * * * *